(12) United States Patent
Lawlor

(10) Patent No.: US 6,446,425 B1
(45) Date of Patent: *Sep. 10, 2002

(54) RAMJET ENGINE FOR POWER GENERATION

(75) Inventor: Shawn P. Lawlor, NE. Redmond, WA (US)

(73) Assignee: Ramgen Power Systems, Inc., Bellevue, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/335,867

(22) Filed: Jun. 17, 1999

Related U.S. Application Data

(60) Provisional application No. 60/089,674, filed on Jun. 17, 1998.

(51) Int. Cl.[7] .................................................. F02C 3/14
(52) U.S. Cl. ...................................... 60/39.02; 60/39.35
(58) Field of Search ............................. 60/39.02, 39.34, 60/39.35, 270.1

(56) References Cited

U.S. PATENT DOCUMENTS 898,753 A    9/1908   Lees et al.

(List continued on next page.)

FOREIGN PATENT DOCUMENTS

DE          554906        5/1932
DE       3144347 A1       8/1983

(List continued on next page.)

OTHER PUBLICATIONS

Liepmann, H.W. and Roshko, A., Elements of Gasdynamics, John Wiley & Sons, Inc., New York, 1957, pp. 114–119.

Hoerner, S.F., Fluid–Dynamic Drag, Horner Fluid Dynamics, New Mexico, 1965, pp. 16–35.

Shapiro, A.H., The Dynamics and Thermodynamics of Compressible Flow, John Wiley & Sons, Inc., New York, 1953, pp. 454–456; 579–580.

(List continued on next page.)

Primary Examiner—Ted Kim
(74) Attorney, Agent, or Firm—R. Reams Goodloe, Jr.

(57) ABSTRACT

A ramjet engine power generator. Supersonic ramjets are provided along a portion of the circumference of a low aerodynamic drag rotor. The rotor is affixed at a central hub to a rotating shaft. The rotor acts as a structural member which transmits to the shaft the thrust generated by the ramjets. In the preferred embodiment, a ramjet inlet captures and compresses an inlet air stream by utilizing the rotor edge profile, the confining strakes which are affixed on the rotor adjacent the thrust module, and an adjacent peripheral and preferably stationary housing sidewall. The compressed air inlet stream provides oxygen for mixing with a fuel, such as natural gas, other suitable hydrocarbons, or hydrogen. The fuel is oxidized in the ramjet combustion chamber(s) to produce expanding combustion gases. Such combustion gases escape by acting against the ramjet outlet throat, adjacent strake structures and the adjacent peripheral housing sidewall, rotating the ramjet at supersonic velocities, and producing shaft energy. A helical strake effectively separates the incoming fuel air mixture from the outgoing combustion gases. In one embodiment, the strake further includes a plurality of cooling orifices which allow passage through the strake of cooling gas, and also reducing boundary layer thickness, thus reducing drag.

73 Claims, 16 Drawing Sheets

U.S. PATENT DOCUMENTS

| | | | |
|---|---|---|---|
| 1,287,049 A | 12/1918 | Kramer | |
| 1,945,608 A | 2/1934 | Hill | |
| 2,115,338 A | 4/1938 | Lysholm | |
| 2,180,168 A | 11/1939 | Puffer | |
| 2,220,066 A | 11/1940 | Cornell | |
| 2,243,467 A | 5/1941 | Jendrassik | |
| 2,395,403 A | 2/1946 | Goddard | |
| 2,402,826 A | 6/1946 | Lubbock | |
| 2,410,538 A | 11/1946 | Walton | |
| 2,425,904 A | 8/1947 | Vernon | |
| 2,430,398 A | 11/1947 | Heppner | |
| 2,444,742 A | 7/1948 | Lutjen | |
| 2,446,266 A | 8/1948 | Cummings | |
| 2,448,972 A | 9/1948 | Gizara | |
| 2,465,856 A | 3/1949 | Emigh | |
| 2,474,685 A | 6/1949 | McCollum | |
| 2,481,235 A | 9/1949 | Parr et al. | |
| 2,486,990 A | 11/1949 | Sharpe | |
| 2,499,863 A | 3/1950 | Hart | |
| 2,509,359 A | 5/1950 | Margolis | |
| 2,523,655 A | 9/1950 | Goddard | |
| 2,579,049 A | 12/1951 | Price | |
| 2,590,109 A | 3/1952 | Lindenbaum | |
| 2,592,938 A | 4/1952 | McNaught | |
| 2,594,629 A | 4/1952 | Exner | |
| 2,603,947 A | 7/1952 | Howard | |
| 2,628,473 A | 2/1953 | Frye | |
| 2,633,701 A | 4/1953 | Moores | |
| 2,649,266 A | 8/1953 | Darrieus | |
| 2,690,809 A | 10/1954 | Kerry | |
| 2,709,889 A | 6/1955 | Mount | |
| 2,709,895 A | 6/1955 | Mount | |
| 2,710,067 A | 6/1955 | Del Pesaro | |
| 2,850,873 A | 9/1958 | Hausmann | |
| 2,895,259 A | 7/1959 | Beckett | |
| 2,994,195 A | 8/1961 | Carswell | |
| 3,001,364 A | 9/1961 | Woodworth | |
| 3,009,319 A | 11/1961 | Filipenco | |
| 3,027,118 A | 3/1962 | Willox | |
| 3,118,277 A | 1/1964 | Wormser | |
| 3,200,588 A | 8/1965 | Math | |
| 3,299,961 A | 1/1967 | Coplin et al. | |
| 3,321,911 A | 5/1967 | Myles | |
| 3,371,718 A | 3/1968 | Bacon | |
| 3,541,787 A | 11/1970 | Romoli | |
| 3,543,520 A | 12/1970 | Kelley et al. | |
| 3,557,511 A | 1/1971 | Campbell | |
| 3,680,308 A | 8/1972 | St. John | |
| 3,727,401 A | 4/1973 | Fincher | |
| 3,811,275 A | 5/1974 | Mastrobuono | |
| 3,937,009 A | 2/1976 | Coleman | |
| 4,024,705 A | 5/1977 | Hedrick | |
| 4,208,590 A | 6/1980 | Blomquist et al. | |
| 4,272,953 A | 6/1981 | Rice | |
| 4,577,460 A | 3/1986 | Wirsching | |
| 4,821,512 A | 4/1989 | Guile | |
| 4,969,326 A | 11/1990 | Blessing | |
| 5,044,163 A | 9/1991 | Brückner et al. | |
| 5,058,826 A | 10/1991 | Coffinberry | |
| 5,129,227 A | 7/1992 | Klees | |
| 5,161,368 A | 11/1992 | Pomerleau | |
| 5,282,356 A | 2/1994 | Abell | |
| 5,289,995 A | 3/1994 | Greene | 244/15 |
| 5,372,005 A * | 12/1994 | Lawler | 60/39.02 |
| 5,408,824 A | 4/1995 | Schlote | 60/39.35 |
| 5,419,117 A | 5/1995 | Greene | 60/224 |
| 5,560,196 A | 10/1996 | Schlote | 60/39.35 |
| 5,636,509 A | 6/1997 | Abell | 60/39.35 |
| 5,660,038 A | 8/1997 | Stone | 60/39.35 |
| 5,709,076 A * | 1/1998 | Lawlor | 60/39.35 |

FOREIGN PATENT DOCUMENTS

| | | |
|---|---|---|
| EP | 0370209 | 5/1990 |
| FR | 627121 | 9/1927 |
| FR | 863484 | 4/1941 |
| FR | 1407868 | 12/1965 |
| GB | 3561 | of 1881 |
| GB | 366450 | 7/1930 |
| GB | 400894 | 11/1933 |
| GB | 581217 | 10/1946 |
| GB | 645641 | 11/1950 |
| GB | 648647 | 1/1951 |
| GB | 2045870 A | 11/1980 |
| GB | 2113769 A | 8/1983 |
| GB | 2165310 A | 4/1986 |
| GB | 2267733 A | 12/1993 |
| SU | 31718 | 2/1934 |
| WO | WO 90/01625 | 2/1990 |

OTHER PUBLICATIONS

Schlichting, H., Boundary–Layer Theory, McGraw–Hill, Inc., New York, 1979, pp. 102–107; 646–653.

Theordorsen, T., and Regier, A., "Experiments On Drag Of Revolving Disks, Cylinders, and Streamline Rods At High Speeds," NACA Rept. 793, 1944.

Millsaps, K., and Pohlhausen, KI., "Heat Transfer by Laminar Flow From a Rotating Plate," Journal of Aeronautical Sciences, vol. XX, 1952, pp. 120–126.

Ostrach, S., and Thornton, P.R., "Compressible Laminar Flow and Heat Transfer About A Rotating Isothermal Disk." NACA Tech., Note 4320, 1958.

Sparrow, E.M., and Gregg, J.L., "Mass Transfer, Flow and Heat Transfer About A Rotating Disk," ASME Paper 59–A–107, 1960.

Dutton, J.C. and Addy, A.L. "A Theoretical and Experimental Investigation of the Constant Area, Supersonic–Supersonic Ejector," AIAA Journal, vol. 20, No. 10, 1982, pp. 1392–1400.

Dutton, J.C., and Carroll, B.F., "Optimal Supersonic Ejector Designs," ASME Paper 86–WA/FE–3, Journal of Fluids Engineering, vol. 108, 1982, pp. 414–420.

Dutton, J.C., and Carroll, B.F., "Limitation of Ejector Performance Due to Exit Choking," Tech Brief, Journal of Fluids Engineering, vol. 110, 1988, p. 91.

Oates, G.C., Aerothermodynamics of Gas Turbine and Rocket Propulsion, American Institute of Aeronautics and Astronautics, Inc., New York, 1984, pp. 119–139.

Anderson, J.D., Introduction To Flight, McGraw Hill, Inc., New York, 1978, pp. 353–357.

Carpenter, P.J., and Radin, E.J., "Investigation of A Ramjet Powered Helicopter Rotor on the Langley Helicopter Test Tower," NACA Res. Memo L53D02, Jun. 1953.

Radin, E.J., and Carpenter, P.J., "Comparison of the Performance of a Helicopter–Type Ram–Jet Engine Under Various Centrifugal Loadings," NACA Res. Memo L53H18A, Oct. 1953.

Hertsberg, A. et al, "Ram Accelerator: A New Chemical Method for Accelerating Projectiles to Ultrahigh Velocities," ATAA Journal, vol. 26, pp. 195–203, Feb. 1988.

Weber, K.F., et al, "Analysis of Three–Dimensional Turbomachinery Flows on C–Type Grids Using an Implicit Euler Solver," Journal of Turbomachinery, vol. 112, pp. 362–369, Jul. 1990.

Yungster, S., et al, "Numerical Simulation of Hypervelocity Projectiles in Detonable Gases," AIAA Journal, vol. 29, No. 2, pp. 187–199, Feb., 1991.

Pratt, D.T. et al, "Morphology of Standing Oblique Detonation Waves," AIAA Journal, vol. 7, No. 5, pp. 837–845, Sep.–Oct. 1991.

Bruckner, A.P., et al, "Operational Characteristics of The Thermally Choked Ram Accelerator," Journal of Propulsion, vol. 7, No. 5, pp. 828–836, Sep.–Oct. 1991.

Van Wie, D., et al, "Application of Busemann Inlet Designs For Flight At Hypersonic Speeds," AIAA paper 92–1210, 1992 Aerospace Design Conference, Feb. 3–6, 1992.

Yungster, S. et al, "Computational Studies of a Superdetonative Ram Accelerator Mode," Journal of Propulsion and Power, vol. 8, No. 2, pp. 457–463, Mar.–Apr., 1992.

Bogdanoff, D., "Ram Accelerator Direct Space Launch System: New Concepts," Journal of Propulsion and Power, vol. 8, No. 2, pp. 481–490, Mar.–Apr., 1992.

Soetrisno, M., et al, "Numerical Simulations of the Transdetonative Ram Accelerator Combusting Flow Field on a Parallel Computer," AIAA paper 92–3249, AIAA/SAE/ASME/ASEE $28^{th}$ Joint Propulsion Conference and Exhibit, Jul. 6–8, 1992.

Yungster, S., "Numerical Study of Shock–Wave/Boundary–Layer Interactions in Premixed Combustible Gases," AIAA Journal, vol. 30, No. 10, pp. 2379–2387, Oct., 1992.

Li, C., et al, "Numerical Simulations of Reactive Flows in Ram Accelerators," Naval Research Laboratory, Washington, D.C., presented at 29 JANNAF Combustion Mtg., Oct. 19–22, 1992.

Zhang, F., et al., "Stability Studies of Detonation Driven Projectiles," Paper Accepted for Presentation At Proceedings of the $19^{th}$ Int'l Symposium on Shock Waves held at Marseille, France, Jul. 26–30, 1993.

Van Wie, D.M., "Application of Scramjet Engine Technology To The Design of Ram Accelerator Projectiles," presented at the JANNAF Combustion Meeting, Monterey, California, Nov. 15–18, 1993.

Pope, G.T., "Ramming Speed," Discover Magazine, vol. 15, No. 3, pp. 50–55, Mar., 1994.

Yungster, S., et al, "Computation of Shock–Induced Combustion Using a Detailed Methane–Air Mechanism," Journal of Propulsion and Power, vol. 10, No. 5, pp. 609–617, Sep.–Oct. 1994.

* cited by examiner

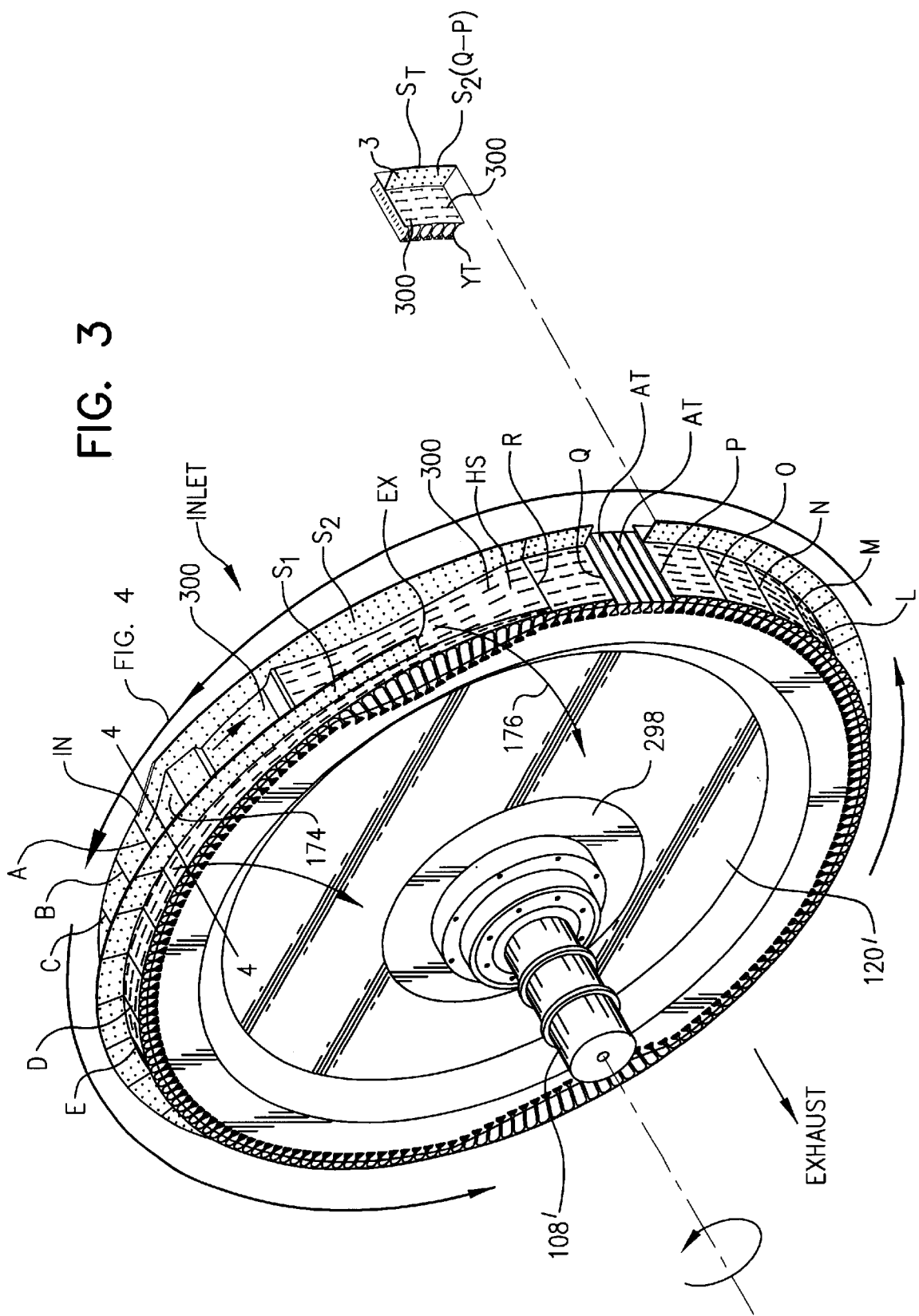

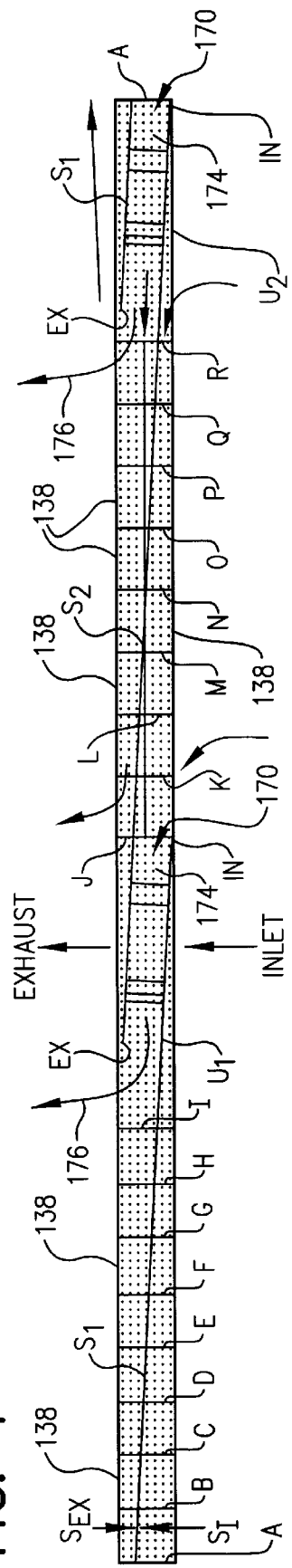

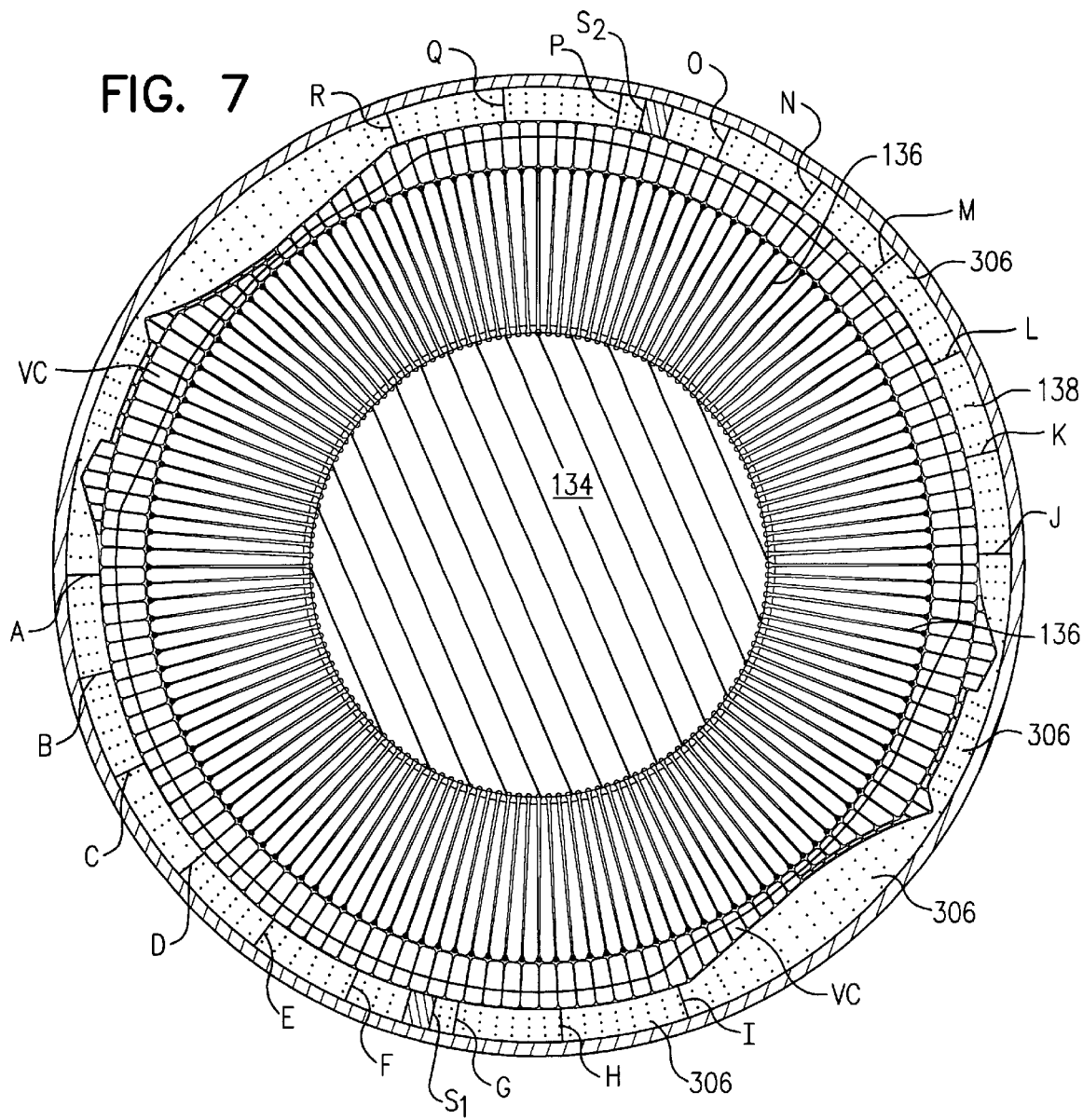

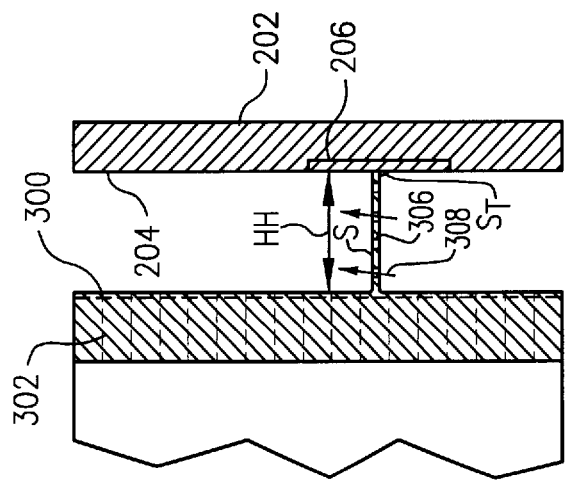
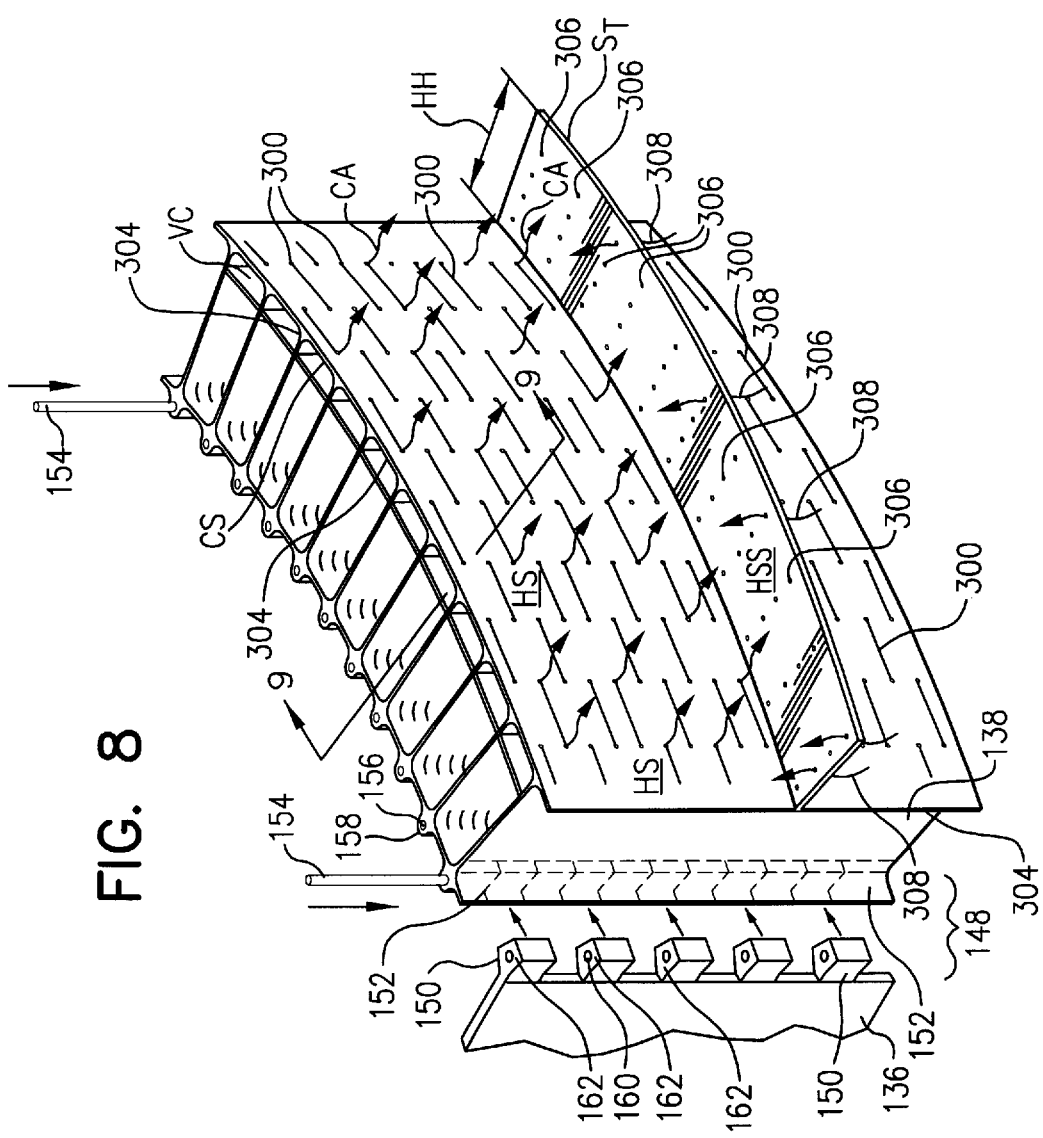

RAMJET ENGINE FOR POWER GENERATION

This application claims the benefit of U.S. Provisional Application(s) Ser. No(s).: 60/089,674 filling date Jun. 17, 1998.

A portion of the disclosure of this patent document contains material which is subject to copyright protection. The owner has no objection to the facsimile reproduction by anyone of the patent document or the patent disclosure, as it appears in the Patent and Trademark Office patent file or records, but otherwise reserves all copyright rights whatsoever.

This invention uses ramjet technology for power generation. The fundamentals the technology were set forth in detail in my prior application Ser. No. 07/945,228, filed Sept. 14, 1992, now U.S. Pat. No. 5,372,005, issued Dec. 13, 1994. Certain embodiments were also provided in U.S. patent application Ser. No. 08/480,663, filed Jun. 7, 1995, now U.S. Pat. No. 5,709,076, issued Jan. 20, 1998. Specific embodiments were also earlier disclosed in my U.S. Provisional Patent Application, Ser. No. 60/028,311, filed Dec. 16, 1996. The disclosures of such patent applications, and the issued U.S. patents, all as just indentified in this paragraph, are incorporated herein by this reference.

This invention is based on, and the benefit of priority under 35 U.S.C. Section 119(e) is claimed from, U.S. Provisional Patent Application No. 60/089,674 filed Jun. 17, 1998.

TECHNICAL FIELD

My invention relates to a high efficiency, novel ramjet driven rotary engine, and to a method for the generation of electrical and mechanical power with the engine, while minimizing emission rates of nitrogen oxides. More particularly, my invention relates to a power plant driven by a ramjet engine, and to structures which are designed to withstand the extremely high tensile stress encountered in a rotating device with distally located ramjets operating at supersonic speeds. Power plants of that character are particularly useful for generation of electrical and mechanical power.

BACKGROUND

A continuing demand exists for a simple, highly efficient and inexpensive thermal power plant which can reliably provide low cost electrical and mechanical power. This is because many electrical and/or mechanical power plants could substantially benefit from a prime mover that offers a significant improvement over currently practiced cycle efficiencies in power generation. This is particularly true in medium size power plants—largely in the 10 to 100 megawatt range—which are used in many industrial applications, including stationary electric power generating units, rail locomotives, marine power systems, and aircraft engines.

Medium sized power plants are also well suited for use in industrial and utility cogeneration facilities. Such facilities are increasingly employed to service thermal power needs while simultaneously generating electrical power at somewhat reduced overall costs. Power plant designs which are now commonly utilized in co-generation applications include (a) gas turbines, driven by the combustion of natural gas, fuel oil, or other fuels, which capture the thermal and kinetic energy from the combustion gases, (b) steam turbines, driven by the steam which is generated in boilers from the combustion of coal, fuel oil, natural gas, solid waste, or other fuels, and (c) large scale reciprocating engines, usually diesel cycle and typically fired with fuel oils.

Of the currently available power plant technologies, diesel fueled reciprocating and advanced aeroderivative turbine engines have the highest efficiency levels. Unfortunately, with respect to the reciprocating engines, at power output levels greater than approximately 1 megawatt, the size of the individual engine components required become almost unmanageably large, and as a result, widespread commercial use of single unit reciprocating engine systems in larger sizes has not been developed. Gas turbines perform more reliably than reciprocating engines, and are therefore frequently employed in plants which have higher power output levels. However, because gas turbines are only moderately efficient in converting fuel to electrical energy, gas turbine powered plants are most effectively employed in co-generation systems where both electrical and thermal energy can be utilized. In that way, the moderate efficiency of a gas turbine can in part be counterbalanced by using the thermal energy to increase the overall cycle efficiency.

Fossil fueled steam turbine electrical power generation systems are also of fairly low efficiency, often in the range of 30% to 40% on an overall net power output to raw fuel value basis. Still, such systems are commonly employed in both utility and industrial applications for base load electrical power generation. This is primarily due to the high reliability of such systems.

In any event, particularly in view of reduced governmental regulation in the sale of electrical power, it can be appreciated that significant cost reduction in electrical power generation would be desirable. Fundamentally, particularly in view of long term fuel costs, this objection can be most effectively accomplished by generating electrical power at a higher overall cycle efficiency than is currently known or practiced.

SUMMARY

I have now invented an improved power plant based on the use of a supersonic ramjet as the prime mover to rotate a power shaft. In using this method to generate electrical power, the supersonic ramjet is directly or indirectly coupled with an electrical generator. By use of a metered fuel feed arrangement, the power output of the ramjet can be turned down as necessary to maintain constant rotating velocity, such as is necessary in synchronous power generation apparatus, at minimal output loads. Throughout its operating range, the supersonic ramjet power plant has greatly increased efficiencies when compared to those heretofore used power plants of which I am aware.

The designs incorporated into my power plant overcomes four significant and serious problems which have plagued earlier attempts at ramjet utilization for efficient electrical power production:

First, at the moderate mach number tip speeds at which my device operates (preferably, Mach 2.5 to about Mach 4.0), the design minimizes aerodynamic drag. This is accomplished by both reducing the effective atmospheric density that the rotor encounters, and by use of a boundary layer control and film cooling technique. Thus, the design minimizes parasitic losses to the power plant due to the drag resulting from rotational movement of the rotor. This is important commercially because it enables a power plant to avoid large parasitic losses that undesirably consume fuel and reduce overall efficiency.

Second, the selection of materials and the mechanical design of rotating components avoids use of excessive quantities or weights of materials (a vast improvement over large rotating mass designs), and provides the necessary strength, particularly tensile strength where needed in the rotor, to prevent internal separation of the rotor by virtue of the centrifugal forces acting due to the extremely high speed rotor.

Third, the design provides for effective mechanical separation of the cool entering fuel and oxidizer gases from the exiting hot combustion gases, while allowing ramjet operation along a circumferential pathway.

Fourth, the design provides for effective film cooling of rotor rim components, including rim segments, rim strakes, and ramjet thrust modules. This novel design enables the use of lightweight components in the ramjet combustor and in the ramjet hot combustion exhaust gas environment.

To solve the above mentioned problems, I have now developed novel rotor designs which overcome the problems inherent in the heretofore known apparatus and methods known to me which have been proposed for the application of ramjet technology to stationary power generation equipment of primary importance, I have now developed a low drag rotor having an axis of rotation, and which has one or more unshrouded ramjet thrust modules rotatably mounted on the distal edge thereof. A number N of peripheral, preferably partially helically extending strakes S partition the entering gas flow sequentially to the inlet to a first one of one or more ramjets, and then to a second one of one or more ramjets, and so on to an Nth one of one or more ramjets. Each of the strakes S has an upstream or inlet side and a downstream or outlet side. For rotor balance and power output purposes, I prefer that the number of ramjets X and the number of strakes N be the same positive integer number, and that N and X be at least equal to two. More preferably, I find it desirable that N and X be equal to five. The exhaust gases exiting from each of the one or more ramjets is effectively prevented from "short circuiting," or returning to the inlet side of subsequent ramjets. In the area of each ramjet combustor, this is effectively accomplished by the strakes S, due to overpressure in the ramjet combustor. Downstream from the ramjet exhaust area, and extending until just before the inlet to the next of the one or more ramjets, the prevention of bypass of the hot exhaust combustion gases to the cool entering fuel air mixture is effectively accomplished by the design of my one or more ramjet thrust modules, as it is preferred that the exhaust gases from each ramjet be expanded to approximately atmospheric pressure, so the strakes S merely act as a large fan or pump to move exhaust gases along with each turn of the rotor.

I have provided several embodiments for an acceptable high strength rotor. In a preferred embodiment, the rotor section comprises a carbon fibre disc. In another, it comprises a steel hub with high strength spokes. In each case, rim segments and ramjet thrust modules are preferably releasably and replaceably affixed to the rotor.

A rotor operating cavity is provided, at least part of which has a lowered atmospheric pressure, preferably in the 1 psia range, in order to eliminate aerodynamic drag on the rotor. The vacuum conditions are assured by use of a vacuum pump to evacuate the operating cavity, and by the use of appropriate seals (a) at the rotor output shaft where it penetrates the operating cavity walls (b) at the rim segments, and (c) at the ramjet thrust modules.

The rim segments and the ramjet thrust module each include a cooling air receiving chamber. The chambers each have radially extending, preferably substantially parallel sidewalls, a radially proximal wall, and a radially distal wall, through which cooling gas outlets penetrate. Such outlets may be cylindrical orifices, or slots, or other desirable shapes. The cooling air receiving chamber functions as a centrifugal compressor for delivery of cooling gas to cooling gas outlet orifices. The exit of the cooling gas orifices is located on the surface of the rim segments and the ramjet thrust modules. The radial dimension at the start of each individual air receiving radially proximal wall determines the distance over which that air receiving chamber operates for compression, and thus determines the pressure of air delivered at the exit of a particular boundary layer cooling outlet orifice.

Attached at the radial end of the rotor are one or more of the at least one ramjets, each ramjet preferably having an unshrouded thrust module construction. The ramjet engines are situated so as to engage and to compress that portion of the airstream which is impinged by the ramjet upon its rotation about the aforementioned axis of rotation. Fuel is added to the air before compression in the ramjet inlet. The fuel may be conveniently provided through use of fuel supply passageways located in an annular ring, with fuel injection passageways communicating between the fuel supply passageways and the inlet air passageway. Fuel injected into the inlet air stream is thus well mixed with the inlet air before arriving at the ramjet engine combustion chamber. The combustion gases formed by oxidation of the fuel escape rearwardly from the ramjet nozzle, thrusting the ramjet tangentially about the axis of rotation, i.e., about the output shaft portions, thus turning the rotor and the coupled output shaft portions. The power generated by the turning output shaft portions may be used directly in mechanical form, or may be used to drive an electrical generator and thus generate electricity. The operation of my ramjet engine may be controlled to maintain synchronous operation, i.e., vary the power output from the ramjet, while maintaining constant speed shaft operation.

When the ramjet power plant is used in a co-generation configuration, the exhaust combustion gases from the ramjet are transported to a heat exchanger, where the gases are cooled as they heat up a heat transfer fluid (such as water, in which case the production of hot water or steam results). The heat transfer fluid may be utilized for convenient thermal purposes, or for mechanical purposes, such as for driving a steam turbine. Ultimately, the cooled combustion gases are exhausted to the ambient air.

Finally, many variations in the air flow configuration and in provision of the fuel supply, secondary fuel supply, and in providing startup ignitors, may be made by those skilled in the art without departing from the teachings hereof. Finally, in addition to the foregoing, my novel power plant is simple, durable, and relatively inexpensive to manufacture.

OBJECTS, ADVANTAGES, AND FEATURES OF THE INVENTION

From the foregoing, it will be apparent to the reader that one important and primary object of the present invention resides in the provision of a novel ramjet powered engine which can be cost effectively used to generate mechanical and electrical power.

More specifically, an important object of my invention is to provide a ramjet driven power generation plant which is capable of withstanding the stress and strain of high speed rotation, so as to reliably provide a method of power generation at high overall efficiency.

Other important but more specific objects of the invention reside in the provision of power generation plants as described in the preceding paragraph which:

have high efficiency rates; that is, they provide high heat and high work outputs relative to the heating value of fuel input to the power plant;

in conjunction with the preceding object, provide lower power costs to the power plant operator and thus ultimately to the power purchaser than is presently the case;

allow the generation of power to be done in a simple, direct manner;

have a minimum of mechanical parts;

avoid complex subsystems;

require less physical space than many existing technology power plants;

are easy to construct, to start, to operate, and to service;

cleanly burns fossil fuels;

in conjunction with the just mentioned object, results in fewer negative environmental impacts than most power generation facilities presently in use;

have a rotating element with a minimal distally located mass structure, and which thus minimizes and therefore is able to withstand the stresses and strains of rotating at very high tip speeds; and which provides for operation with minimal aerodynamic drag.

One feature of the present invention is a novel high strength rotor structure. In one design, a high strength steel inboard section is provided with high strength spokes that at their distal end suspend a rotating rim that has unshrouded ramjet thrust modules integrated therein. This unique structure enables operation at rotational speeds above stress failure limits of many conventional materials, while simultaneously providing for adequate cooling of the rim and ramjet structure, in order to maintain material integrity, at the high temperature operating conditions. In another design, a carbon fiber epoxy composite disc is provided, which simplifies the overall construction while providing an abundance of strength, while still providing a ventilated positive cooling system design to maintain structural integrity of the rotor, and of the rim and ramjet structure.

Another feature of the present invention is the use of a unshrouded ramjet design. In this design, a sturdy, stationary, peripheral wall which surrounds the rotating portion of the ramjet functions as part of the ramjet thrust module. This unique design enables use of a minimal rotating mass at the high design tip speeds, thereby enabling the rotor to be designed with lower strength materials and/or a higher margin of safety with respect to overall tensile strength requirements for a given ramjet operational mach number.

Still another important feature of the present invention is the use of strakes to partition the ramjet inlet air flow (and preferably in which inlet air flow the fuel and air are pre-mixed) from the ramjet exhaust gas flow. This elegant design feature assures that exhaust gases are directly removed from the engine, and that only the amount of inlet air necessary for combustion in the ramjets is required to be provided.

Finally, another important feature is the use of perforations in the strakes to minimize boundary layer buildup, (and accompanying drag) during high speed operation, by passing a small portion of pressurized gas thru such perforations to sweep away an otherwise stable boundary layer zone.

Other important objects, features, and additional advantages of my invention will become apparent to those skilled in the art from the foregoing and from the detailed description which follows and the appended claims, in conjunction with the accompanying drawing.

BRIEF DESCRIPTION OF THE DRAWING

FIG. 3 is a perspective view of a rotor with integral (a) rim, (b) unshrouded ramjet, and (c) strake, showing in particular a rim segment with strake segment, and also illustrating cooling air slots in rim segments, as well as boundary layer control orifices in the strakes.

FIG. 4 is a circumferential edge view of a rotor, taken as starting at line 4—4 on the circumference of the rotor just shown in FIG. 3, with the rotor edge peeled and laid out flat, showing a pair of unshrouded ramjet thrust modules and the relationship of rim segments and integral strake segments.

FIG. 7 provides a cross-sectional view of second embodiment of my rotating assembly, showing a steel rotor, unshrouded ramjet thrust modules with strakes, and the cooperating peripheral wall against which compression occurs.

FIG. 8 shows a rim segment with integral strake segment, and also clearly shown are the cooling air passageways and a slotted type exit pathway, i.e., the film cooling orifices, as well as the boundary layer control orifices in the strakes.

FIG. 9 is a partial cross sectional view, taken as if through a portion of section 9—9 of FIG. 8, showing the close fitting relationship of the rotor strake with the interior surface of the cooperating peripheral wall, and indicating the flow of air thru boundary layer control orifices in the strake.

DETAILED DESCRIPTION

Figure 1:
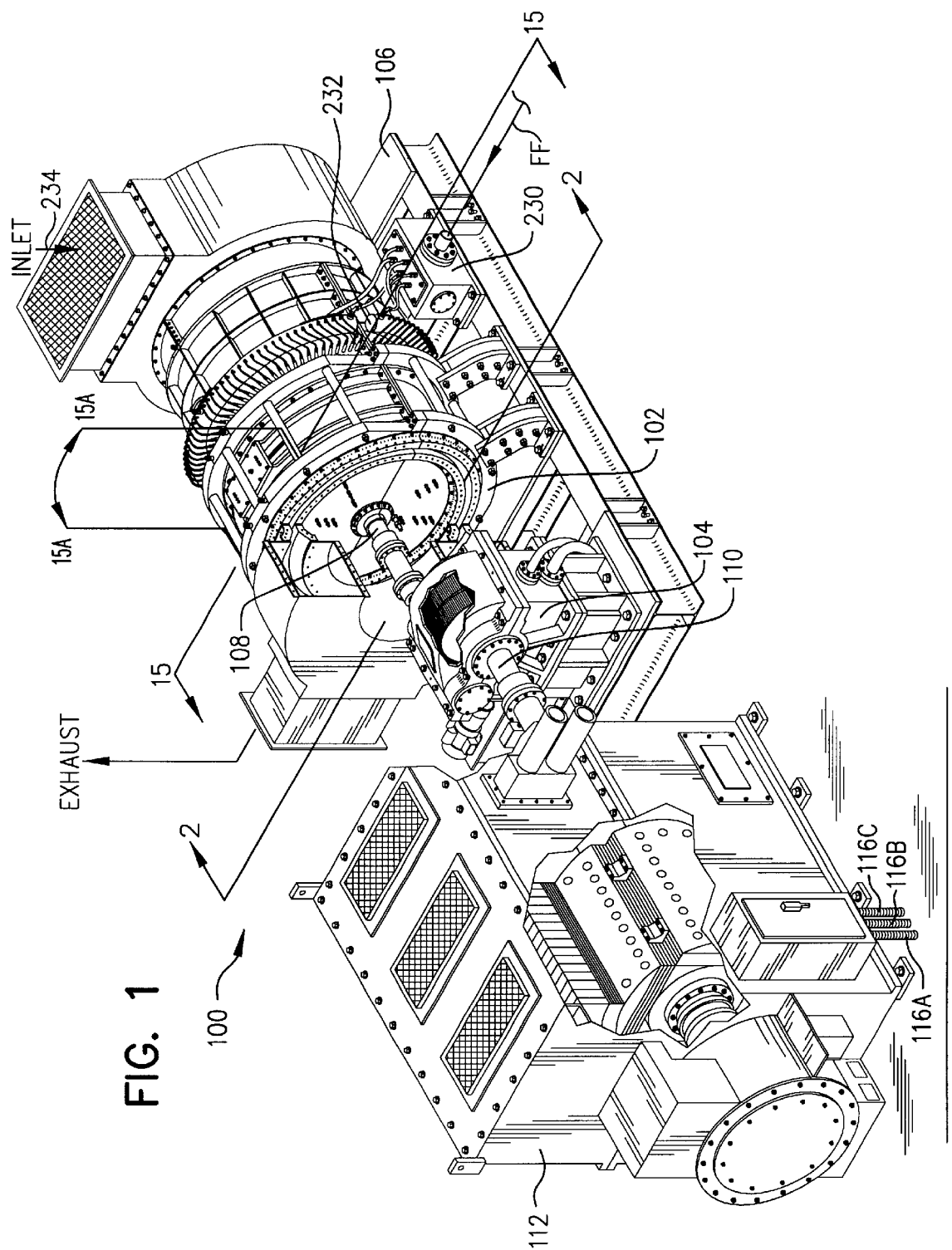
FIG. 1 provides a partial perspective view of my novel power plant apparatus, showing the primary rotor of the power plant rotating within a housing, to drive an output shaft portion which is coupled with a gear box, which is operatively connected to an electric generator.

Referring now to the drawing, FIG. 1 depicts a partial cut-away perspective view of my novel supersonic ramjet thrust module driven power plant 100. Major components shown in this FIG. 1 include the supersonic ramjet engine assembly 102 and gear set 104 on ramjet engine skid 106. The ramjet engine assembly 102 has a driven output shaft 108, which is coupled with gear set 104 for power transfer therethrough. Gear set 104 has power output shaft 110, which is coupled with and rotates at a desired rate of rotation to drive electrical generator 112. Electrical power is output from electrical generator 112 via cable in conduits $116_A$, $116_B$, and $116_C$. Alternately, mechanical power output can be provided from the engine assembly 102.

Figure 11:
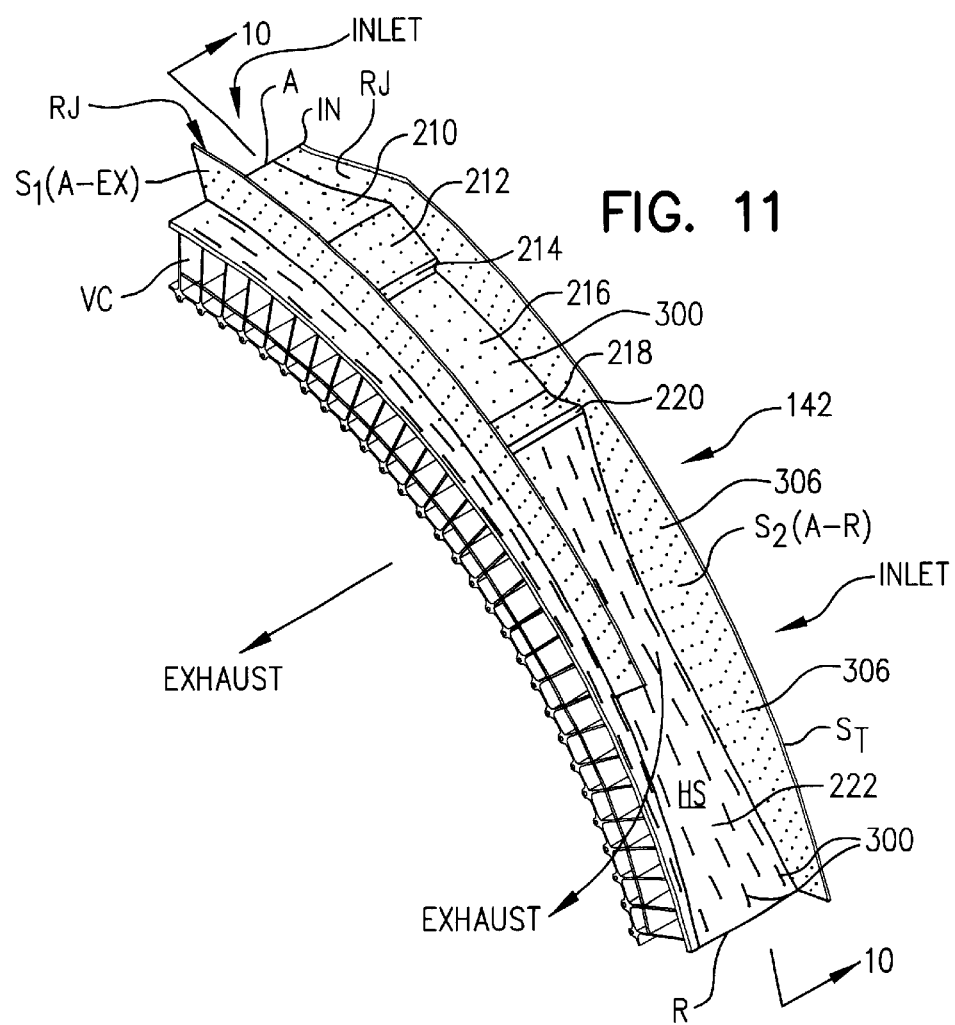
FIG. 11 shows a perspective view of the thrust module and integral strake just set forth in FIG.10.
Figure 18:
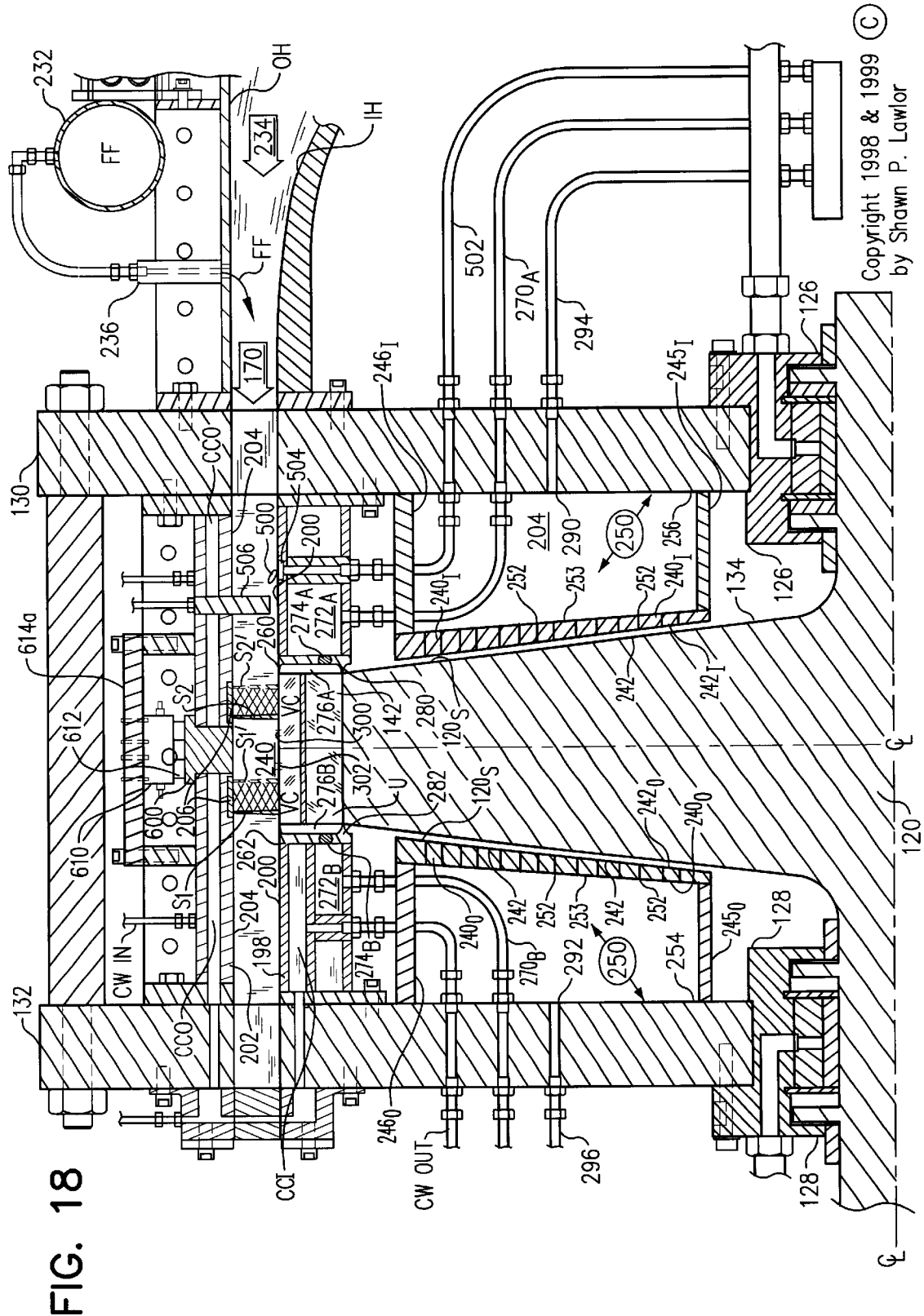
FIG. 18 is a partial cross-sectional view of my novel ramjet thrust module driven engine, which shows details of the low drag housing using a vacuum boundary layer control system, the gas bypass valve, and the varying position of strakes as the rotor turns about its axis of rotation.

The structure of the supersonic ramjet engine which is housed in ramjet engine assembly 102 can be understood by review of related FIGS. 2, 3, 4, 7, 8, 10, 11, and 18. I have now developed a high strength rotor 120 (also, see rotor 120') which has output shaft portions 108 and 124. The output shaft portions 108 and 124 turn in inlet and outlet bearing assemblies 126 and 128, respectively, which bearing assemblies are housed in bearing plate frames 130 and 132, respectively. In FIGS. 2, 7, 8, 10, and 11, one embodiment 120 of my high strength rotor design (and/or components thereof), is shown, illustrating rotor construction using a rotor hub 134 (preferably high strength steel), to which is secured radially extending spokes 136, and from which are secured ventilatable rim segments 138, or alternately, a ventilatable unshrouded ramjet 142 such as depicted in FIGS. 11 and 18.

Figure 2:
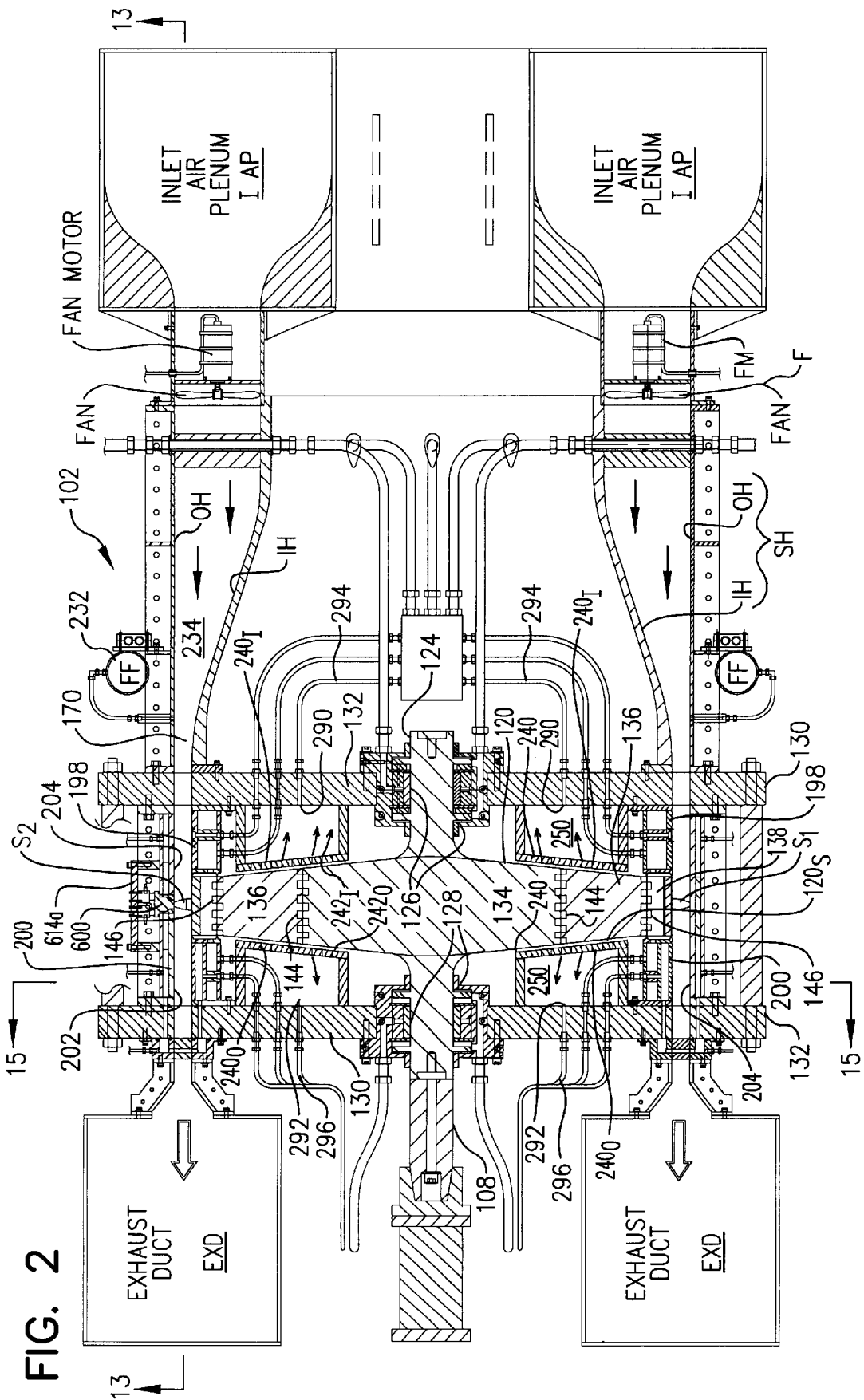
FIG. 2 is a partial sectional view of my ramjet power plant apparatus, showing a rotating output shaft portion affixed to a rotor and rotatably secured therewith, and an unshrouded ramjet thrust module integrally provided with the rotor. Additionally, the inlet air duct is shown, along with the transition to an annular passageway having a peripherial wall section in the combustion zone; the exhaust gas outlet from the combustion zone also shown, along with the exhaust gas ducting. Cooling air, cooling water, and the vacuum lines used to help reduce aerodynamic drag near the rotor are illustrated.

For ease of construction, I prefer to use an interlocking hinge type attachment arrangement, as can be seen in FIGS. 2 and 8, for (a) interlocking hinges 144 between hub 134 and spokes 136, or (b) interlocking hinges 146 are provided between spokes 136 and each ramjet. As depicted in FIG. 8, interlocking hinges 146 between spokes 136 and rim segments 138 are formed by hinge segments 150 on spokes 136 and complementary hinge segments 152 on rim segments 138. In one embodiment, a pin 154 is used for insertion in a tight fitting relationship through aperture 156 which is defined by wall 158 in hinge segments 152 in rim segment 138, and through matching aperture 160 defined by wall 162 in hinge segments 150 in spoke 136. As provided, any of the rim segments 138 or the ramjet thrust modules (see $U_1$ or $U_2$ in FIG. 4) are releaseably affixed as a part of the fully assembled rotor 120, and thus rim segments 138 and the ramjet thrust modules $U_1$, $U_2$, etc., (see FIG. 4A) may be easily replaced.

FIGS. 3, 5, 6, and 12 depict a similarly functioning design using carbon fibre materials for the rotor 120'. A series of T-shaped or bulb shaped attachment tabs AT are cut into rotor 120'. During assembly, tabs AT are slipped between Y-shaped tines YT that extend inwardly from each of the rim segments 138 or ramjet thrust modules $U_1$, $U_2$, etc.

Figure 4A:
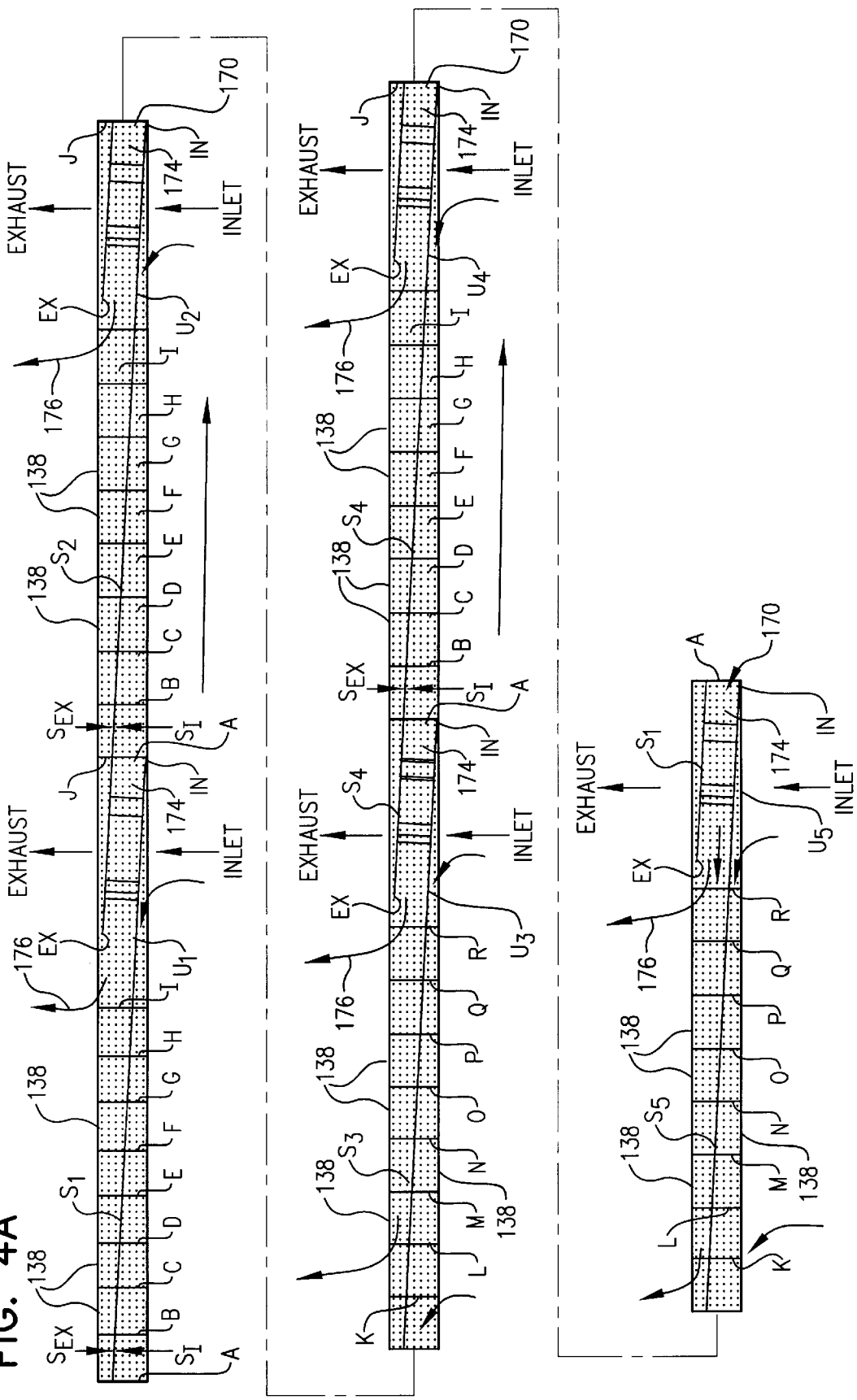
FIG. 4A is a circumferential edge view of a rotor, similar to the view just set forth in FIG. 4, but now showing an embodiment where five ramjets, and their accompanying strakes, are illustrated.

As seen in FIG. 4, or FIG. 4A, the circumference of rotor 120 or 120' is made up of a plurality of rim segments 138 (defined between lines M–N, N–O, etc.) and one or more ramjets (see FIG. 4, where $U_1$, is defined between lines I–J, and $U_2$ is defined between lines A–Q, for example) . Importantly, there are also a number of peripherially extending strakes $S_1$, through $S_N$. Each of strakes $S_1$ through $S_N$ has a number of strake segments, each strake segment is preferably integrally formed with a rim segment 138, or with a ramjet 142, as appropriate, as further shown in FIG. 4 or 4A. Each of the strake segments may be defined by their edge pair, as seen in FIG. 4 starting at $S_1$(IN-I) at the inlet IN for mixed gas 170, then on to $S_1$(I-H), then to $S_1$(H–G), and so on through to $S_1$(A-EX), which ends at the exhaust point EX of the strake for combustion gases 176. Similarly, strake segments for strake $S_2$ start at $S_1$(IN-R), at the inlet IN, then on to $S_2$(R–Q), etc., in like manner. The strakes $S_1$ through $S_N$ partition entering gas 170 (which preferably is mixed to provide both fuel and oxidizer), so that the mixed gas 170 flows to the ramjet inlet throat 174. This process occurs at a first ($U_1$) of one or more ramjets U and then at a second ($U_2$) of one or more ramjets U and so on to an Xth ($U_X$) one of the one or more ramjets U which are mounted for rotation at the distal edge of rotor 120. For operational and rotor balance purposes, I prefer that the number X of ramjets U and the number N of strakes S be the same positive integer number, and that N and X each be at least equal to two. More preferably, I prefer than N and X be five, or at least five.

The strakes $S_1$ through $S_N$ allow feed of mixed gas, i.e, a combustible fuel-air mixture 170, to each ramjet $U_X$ without appreciable bypass of the entering mixed gas 170 to the exhaust combustion gases 176. Also, and importantly, the exhaust combustion gases 176 exiting from each of the one or more ramjets U is effectively prevented by the arrangement of strakes S from "short circuiting," by substantially prevent the return of combustion gases 176 from the exhaust side SEX to the inlet side $S_I$ to the inlet side of subsequent ramjets. This strake feature can be better appreciated by considering the rotor or rotating assembly 120 (at respective portions thereof as seen such as in FIGS. 9 and 18). The rotor 120 revolves in close proximity (a) to a fixed, annular shaped inboard housing 198 with inboard wall surface 200, and (b) to a preferably fixed, annular shaped peripheral wall 202 which has an interior peripheral wall surface 204. The strakes S have a height HH (substantially radially extending) which extends to a tip end $S_T$ that is designed for rotation very near to the interior peripheral wall surface 204. As seen in FIG. 9, a wear ring 206 of soft sealing metal is provided as an insert into the fixed peripheral wall 202, to allow for tight fitting abutment of the tip end $S_T$ of strake S with the wear ring 206 that is provided in the peripheral wall surface 204.

Figure 5:
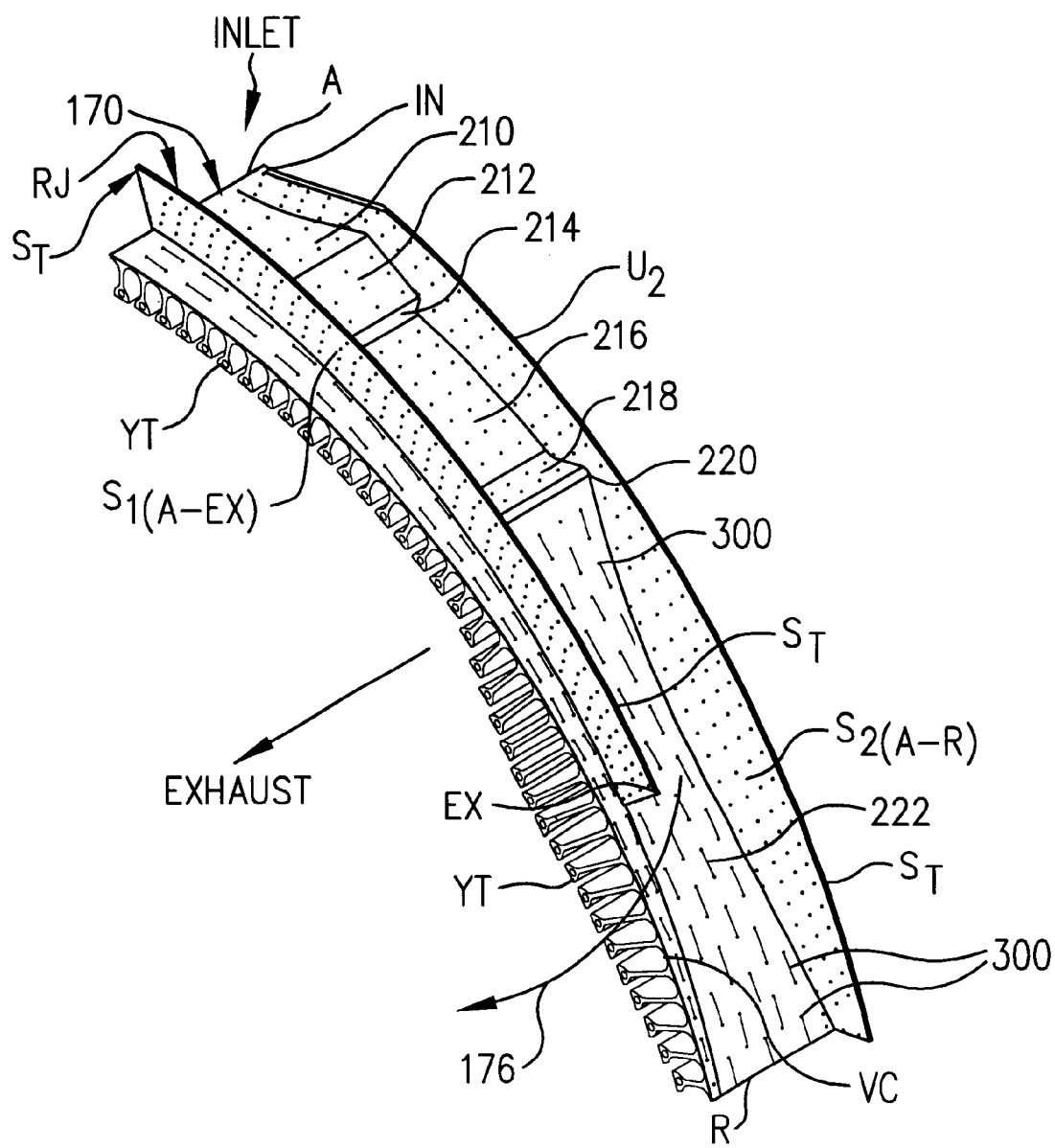
FIG. 5 shows, in perspective, a rim segment which includes an unshrouded ramjet thrust module and related integral strake segments, and where the strakes include boundary layer control orifices.
Figure 6:
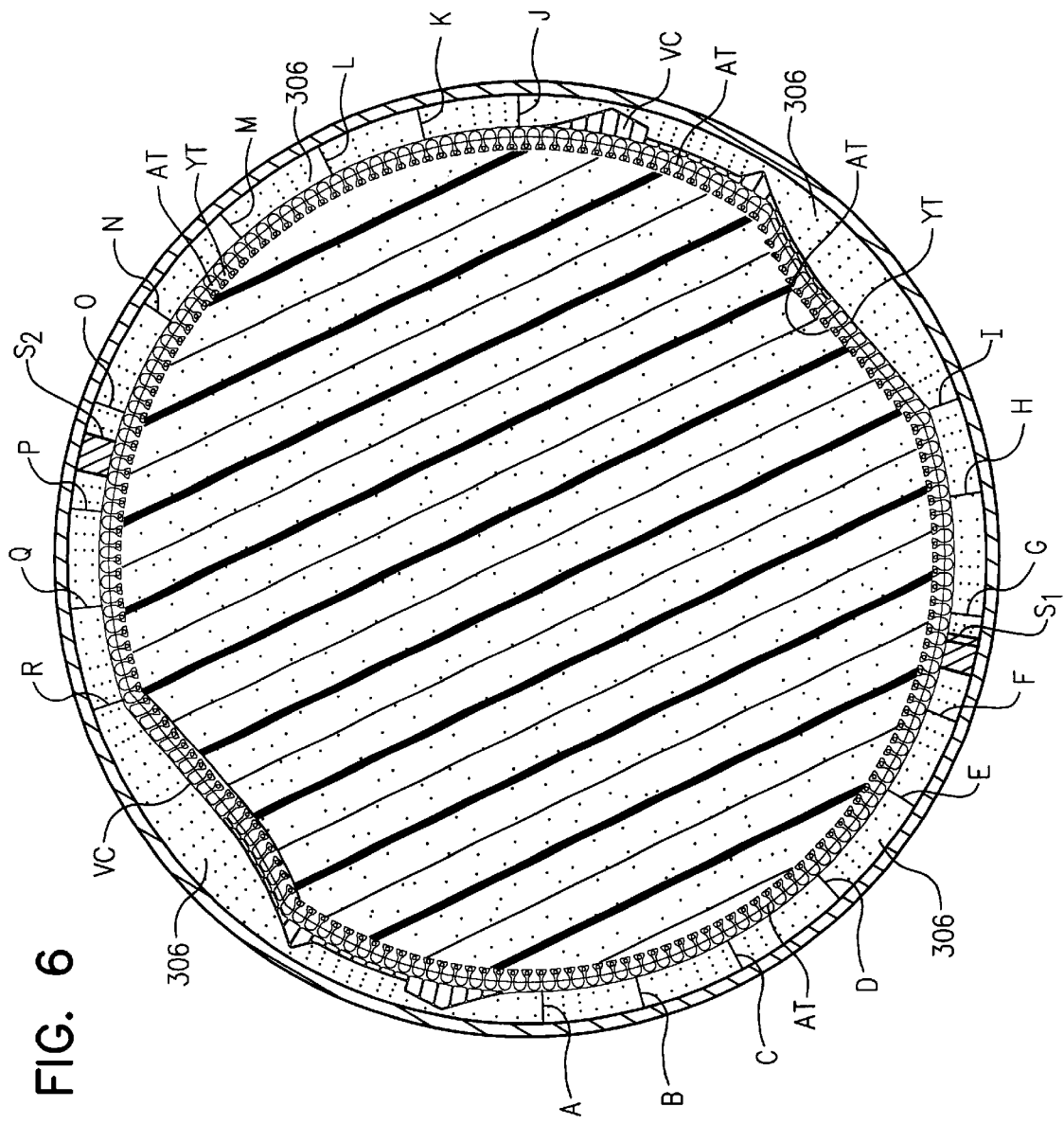
FIG. 6 provides a cross-sectional view of a carbon fibre rotor, unshrouded ramjet thrust modules, and the cooperating peripheral wall against which compression occurs.
Figure 10:
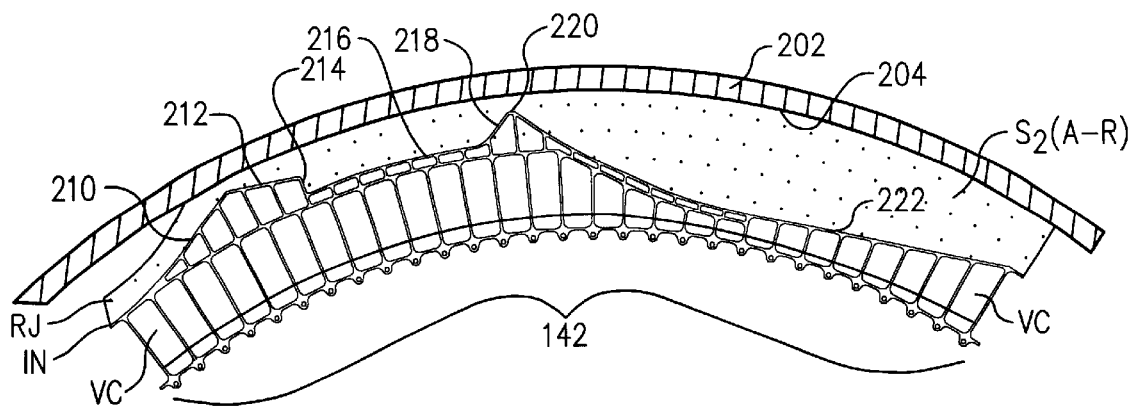
FIG. 10 shows, in a partial cross sectional view, one embodiment of an unshrouded thrust module and integral strake with boundary layer control orifices, where compression occurs against a cooperating peripheral wall.

The construction and operation of my ramjet(s) U is unique. The ramjet thrust modules U, such as seen in FIGS. 5 and 11, are provided in an unshrouded configuration. The structures depicted in FIGS. 5 and 11 and described below provide the necessary elements for compression of incoming gas (preferably, a fuel-air mixture), except for a containment structure against which compression and expansion can occur. In this unique engine, such containment structure for both compression of incoming gas, and expansion of exhaust gas, is provided by the interior peripheral surface 204 of the cooperating peripheral wall 202. Cooling water CW is provided to outer cooling chambers CCO for cooling the peripheral wall 202 and its surface 204, and to inner cooling chambers CCI for cooling the inboard housing wall 198 and its surface 200.

The actual ramjet compression area and ramjet structure can be seen in FIGS. 5 and 11. An incoming mixed gas stream 170 is compressed by the ramjet inlet or ramp structure 210, between the ramjet side RJ of inlet portion of strake $S_2$(IN-R) and the ramjet side RJ of inlet portion of strake $S_1$(A-EX). Subsequently, transition section 212 is provided to stabilize the normal shock process, which is followed by a stepdown at flameholder 214 to the combustor 216. Combustion takes place in combustor 216, and pressure builds (to about one hundred eighty pounds per square inch or another suitable pressure, depending upon the design criteria chosen in this critical region). Combustion gas pressure builds up along the geometric throat 218, to the choke point 220. After exiting the choke point 220, via the outflow nozzle 222, the combustion gases expand to near atmospheric pressure and cool, normally to about 1100° F. or thereabouts. The preferably helical strakes $S_x$ ($S_1$ and $S_2$ shown) are thin walled, for example in one design are about 0.15 inches in width (axially) at the root, and about 0.10 inches in width at the tip. With the design illustrated herein, leakage of combustion gases is minimized, and substantially limited adjacent the high pressure region of the combustor 216.

Also shown in FIGS. 8 and 9 is the use of boundary layer orifices in the strake S to allow a small quantity of gas to escape thru the strake, to thereby assist in minimizing aerodynamic drag on the strake. The exact size and spacing of such orifices will depend upon the design speed, strake size, and design pressures, but in one embodiment, I prefer the use of small circular orifices of about 0.020 inches in diameter.

Turning now to FIGS. 2 and 18, the overall structure of the ramjet engine in my power plant is further illustrated in these views. Ramjets $U_1$ and $U_2$ are suitable for oxidizing a fuel FF continuously supplied thereto and well mixed in an incoming oxidizer stream, normally an air stream. Incoming fuel FF is supplied from a fuel main to fuel supply pressure regulator 230 (see FIG. 1). As indicated in FIG. 18, fuel FF is then sent to fuel supply manifold 232, and finally into an entering airstream 234 via injectors 236, to provide a well mixed fuel air gas stream 170. The entering airstream 234 is preferably provided through an annular supply housing SH defined by inner walls IH an outer walls OH, by one or more fans F as driven by fan motor FM, or by other suitable means, for the supply of combustion air supply from an inlet air plenum IAP. The injectors 236 are preferably located sufficiently upstream of the ramjets $U_1$, $U_2$, etc., so as to provide adequate fuel mixing. The well mixed gas stream 170 is fed to ramjets U, which preferably utilizes oxygen from the incoming airstream 234 (from an ambient air supply at the plant site) as the oxidant source. Ramjets U are provided at the outer, distal reaches of rotor 120 (or carbon type rotor 120') so that the propulsive effect of the ramjets U is utilized to turn rotor 120 or 120' including (preferably directly) the output shaft 108 or 108', respectively.

The rotor 120 is rotatably secured in an operating position by a fixed support structure such as inlet and outlet bearing plate frames 130 and 132 in a manner suitable for extremely high speed operation of the rotor 120 (or rotor 120'). Ideally, rotation rates in the range of 10,000 to 20,000 rpm, or higher, are achieved. In this regard, inlet side bearing assembly 126 and outlet side bearing assembly 128, or suitable variations thereof, must provide adequate bearing support for high speed rotation and thrust, with minimum friction. The detailed bearing and lubrication systems may be provided by any convenient means by those knowledgeable in high speed rotating machinery, and need not be further discussed herein.

I prefer to use a boundary layer control technique to reduce the parasitic aerodynamic drag on the rotor 120. As best seen in FIG. 18, one suitable method is to provide a pair of tight fitting housings, including inlet side housing $240_I$ and outlet side housing $240_O$, each housing having a rotor side surface ($242_I$ on the inlet side and $242_O$ on the outlet side) in close proximity to the respective inlet and outlet side surface $120_S$ of rotor 120. More preferably, providing and sealing an operating cavity 250, behind the tight fitting housings $240_O$ and $240_I$, so as to enable provision of a vacuum environment having an operating pressure of about 1 psia, allows most gas on the surface $120_S$ of the rotor to be suctioned off thru orifices 252 through housings $240_I$ and $240_O$.

An operating cavity $250_I$ is formed between interior wall $253_I$ of housing $240_I$ and inlet wall 256 of inlet bearing plate frame 130, between radially inward wall $245_I$ and radially outward wall $246_I$. Likewise, an operating cavity $250_O$ is formed between interior wall $245_O$ of housing $240_O$ and outlet wall 245 of outlet bearing plate frame 132, between radially inward wall $245_O$ and radially outward wall $246_I$. As just mentioned, preferably these cavities 250 are evacuated to about 1 psia during normal operation. As also seen in FIG. 18, an outer labyrinth type seal 260 can be provided on the inlet side and another labyrinth type seal 262 is provided on the outlet side of the ramjet thrust module U. These seals hinder "in-leakage" of gas toward the evacuated operating cavities 250.

For cooling of the rim segments 136 and the ramjet thrust modules $U_1$ and $U_2$, a supply of compressed air is provided through air lines 270A and 270B. I prefer to supply air at about 250 psig and about 80° F. to chamber 272A and 272B, and allow it to expand through porous metal orifices 274A and 274B to about 13.5 psia and about −150° F. (minus 150° F.), before entering distribution chambers 276A and 276B, respectively. From distribution chambers 276A and 276B, the cooling air is injected into each ventilation chamber VC of the respective rim segment 136 or ramjet thrust module U such as thrust module 142. Leakage of the cooling air from chambers 276A and 276B to the operating cavity 250 is substantially prevented by labyrinth type seals 280 and 282. Vacuum in cavity 250 is maintained via pump (not shown) acting on ports 290 and 292 to vacuum lines 294 and 296.

A second embodiment for a desirable rotor design is shown in FIGS. 3, 5, 6 and 12. Here, a high strength carbon fibre rotor 120' and complementary rim segments are provided. The rotor 120' has a high strength inboard portion 298 and output shaft 108' which secured to inboard portion 298 and rotatable therewith.

Figure 12:
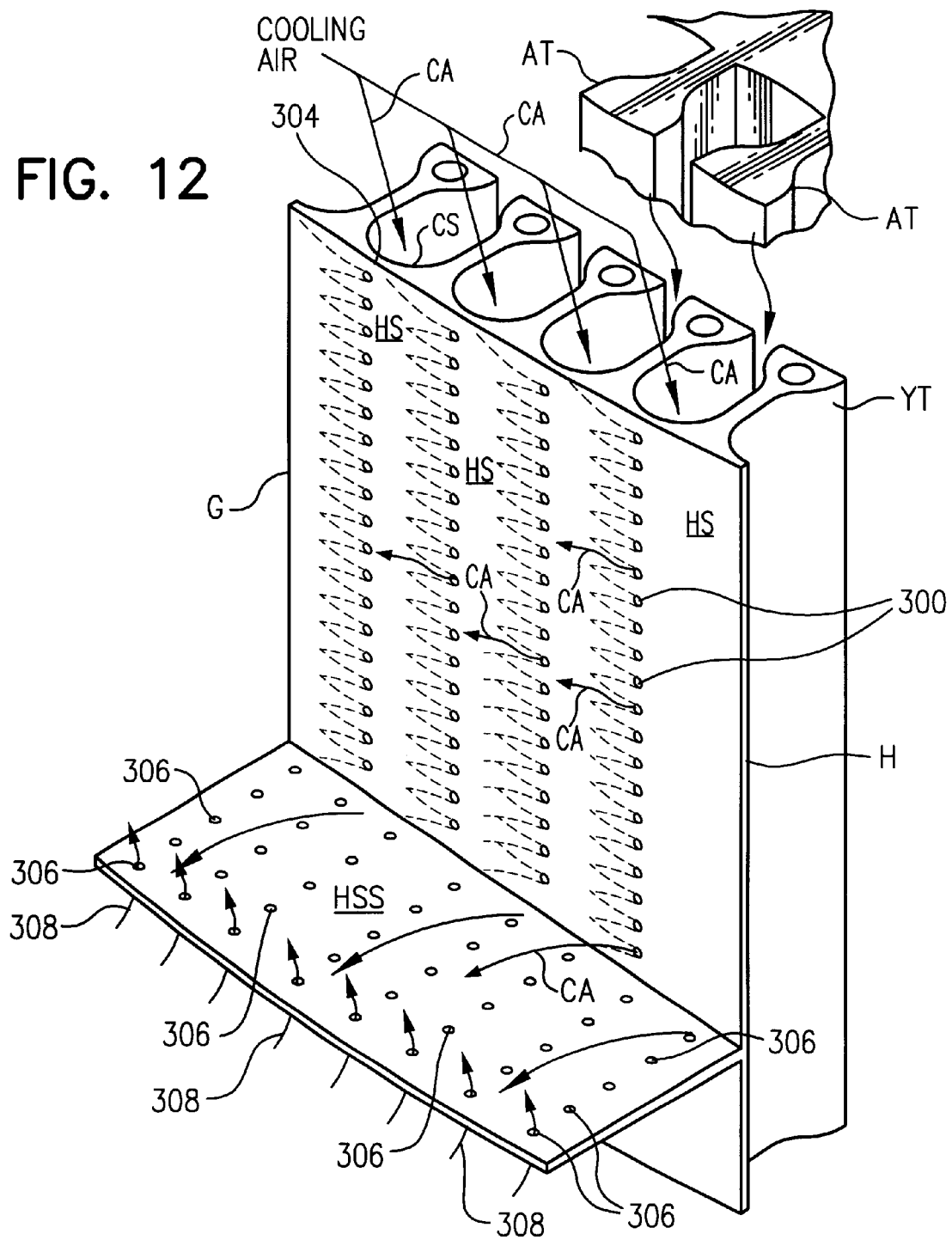
FIG. 12 shows a perspective view of one embodiment of a rotor segment with integral strake, revealing details of an embodiment of film cooling using orifices, and showing related radial boundary layer flow on the strake, and the use of boundary layer control orifices.

As illustrated particularly in FIGS. 4, 5, 8, 11, and 12, I prefer the use of ventilatable, film cooled surfaces, both on rim segments and in combustion chamber 216 on ramjet U. Cooling air is supplied, preferably via compressed air, to a ventilation chamber, such as chamber VC in each portion of the ramjet U. As easily seen in FIGS. 8 and 9, the ventilation chambers VC act as a centrifugal compressor, and the compressed cooling gas is sent outward through cooling passageways 302 in the coolable wall 304 having a hot surface HS to outlets 300. Preferably, a high density pattern of cooling air passageways 302 is provided. Either orifices or slots are provided for outlets 300. The exact parameters depend upon the characteristics of a particular design, including the speed (inlet Mach number), capacity (mass flow), and other factors. In this manner the ventilatable rim segments 138 and the ventilatable unshrouded ramjets 142 are provided with a cooling air flow path through a coolable wall 304. As seen in FIG. 12, cooling air CA is supplied to ventilation chambers VC, which have an inner cold surface CS. A hot surface HS is located on the radially distal side of the rim segments 138 and ramjets 142. Due to the swirling action of the strakes, the cooling air CA emerging from outlets 300 of passageways or orifices 302 is advantageously swept along the hot surface HSS of the strakes, to assist in cooling of the strakes. Note that in FIG. 8 the cooling air arrows CA are exaggerated to diagrammatically depict the flow of cooling air outward through outlets 300. In actual practice, the cooling air CA encounters the high speed flow of combustion gas 176 and a very thin, but effective cooling film layer is formed. Of course, one side of each strake S is primarily in contact with cool mixed gas inlet air 170. The film cooling method just described is important since it allows the use of materials such as titanium in a combustion environment. In this manner, the high temperature generated by combustion gases is prevented from damaging the combustor and other parts subjected to heating by the combustor and by the hot combustion gases along the exhaust pathway.

As mentioned above, as a further enhancement to the method just described, illustrated in FIGS. 8, 9 and 12 is the use of orifices 306 through strakes S, to allow cooling gas as depicted by arrows 308 to pass thru the strakes S. The orifices 306 can be effectively sized to control aerodynamic drag on the strake S, by reducing boundary layer thickness on the strake S.

A key feature of my power plant is the rotor 120 (or 120'). The rotor 120 spins about its axis of rotation due to thrust generated by the ramjets U. Two design parameters of the rotor 120 are extremely important. First, the rotor must be constructed of materials which enable it to survive the extremely high centrifugal loads encountered while the rotor is moving at a rotational rate so that the peripherially mounted ramjet can operate at supersonic speeds, preferably in the Mach 3.5 range, i.e., the rotor must be capable of withstanding extremely high tensile stress. Second, at such speeds, minimizing the overall aerodynamic drag is critical.

The structural design and material systems used for the rotor are as important as the aerodynamic performance of the rotor and the propulsive performance of the thrust module discussed above. All three design elements (rotor materials, rotor aerodynamic design, and ramjet thrust module performance) must be properly executed to place into operation a high performance, maximum efficiency ramjet engine as set forth herein.

Because of the centrifugal loads induced by the extreme speed with which the rotor turns, the material and structural characteristics of the rotor are vitally important design elements. Thus, it is instructive to consider specific stress of materials, that is, the stress per unit mass of material. The specific stress has units of inches, because the density of a specific material is cancelled out of the mathematical relation. Thus, specific stress varies only with rotation rate. It is important to note that at the rotation rates of importance in the practice of the present invention, extremely high specific stresses are encountered. For example, at a rotation rate of 15,000 rpm, about 1.5 million inches of specific stress would be encountered by a rotating disc, and about 1.8 million inches of specific stress would be encountered by a rotating rod. It can be seen that in addition to the possible aerodynamic advantages discussed above, a rotating disc also may offer a slight advantage with respect to materials requirements.

Any given material has associated with it a specific strength which is commonly defined as the ultimate tensile strength of a material divided by its density. Like specific stress, specific strength has the units of inches. The two values are directly comparable; specific strength sets forth the load which a given material can withstand, and specific stress sets forth the load which a given material will encounter when used in a given application.

Table I shows the specific strength for various materials, including titanium, advanced metal matrix composites, and carbon based conventional composites. Evaluation of the meaning of the specific strength data is straightforward. It is clear from Table I that as the rotational speed of a rotor is increased, the specific stresses required may ultimately reach the specific strength of a given material. If the speed is increased beyond that point, the load will exceed the specific strength, and as a result, the material will fail. In summary, the specific stress expected to be encountered by rotors for the instant invention exceeds the specific strength of commonly available materials such as low strength steel, magnesium, and aluminum, and thus such materials are not suitable, at least as a single structural material, for use as the primary structural material in the rotor means of the present invention.

TABLE I

SPECIFIC STRENGTHS FOR VARIOUS MATERIALS

| Material | Specific Strength (inches) |
|---|---|
| Low Strength Steel | 176,000 |
| Magnesium | 584,610 |
| Aluminum | 594,060 |
| Titanium | 683,220 |
| Silicon Carbide Reinforced Titanium | 1,300,250[1] |
| Kevlar Reinforced Polyester | 3,752,600 |
| Monofilament Carbon fibers | 15,000,000 |

The rotor for the proposed power plant must turn at speeds at least up to about 8,000 rpm to 10,000 rpm or more, and more preferably, between 10,000 and 20,000 rpm. It is readily apparent from Table II that not even titanium, with its excellent specific strength characteristics would represent a practical material for rotor construction. However, it is possible to reduce the specific stress encountered, by tapering a rotor element. Nevertheless, it is clear, given the specific stress levels encountered by rotor shapes operating at the speeds required, that commonly utilized metals or metal alloys do not have sufficient specific strength to withstand the loads encountered at the most desirable rotation rates. Newly developed metal matrix composites do provide acceptable strength, however, and can survive the required loads.

Carbon fiber reinforced polyester and epoxy composites easily have the specific strength required for service in the instant invention. As indicated in Table II, pure carbon monofilament fiber bundles or "tows" are commercially available with specific strength levels up to 15 million inches, and clearly has a wealth of extra strength capability. Unfortunately, when unprotected, both carbon fiber and epoxy composites lack the capability to resist high temperature exposure. However, if insulated from an oxidizing environment, the carbon tows can accommodate extremely high temperature with only minimal reduction in strength.

In one embodiment, the basic rotor structure can be designed and fabricated using both metal matrix composites and carbon or other high strength fiber windings. With proper thermal and oxidative protection, monofilament carbon fiber tows can be combined into a structure with excellent strength and high temperature capability. In the composite design, high strength is provided by continuous monofilament carbon fibers, so as to give the structure sufficient reinforcement to withstand the centrifugal loads encountered. The high specific strengths of the carbon fibers make them quite suitable for the fabrication of stiff, strong, and lightweight composite rotors which can minimize vibrational and static load bending. The carbon fiber windings thus become a central tensile reinforcement element which carries the bulk of all centrifugally induced mechanical loads. As an alternative to use of carbon fiber or other high strength windings, a solid rotor design may be completed utilizing silicon carbide coated carbon fiber metal matrix composite materials.

The safety margin for rotor materials can be increased by increased by increasing the material taper ratio. Preferably, in order to minimize the actual loading to the extent practical, the rotor means should be built with high strength materials in shapes which have large material taper ratios. This basically means that at increasing radial station, (further from the axis of rotation), the rotor means should become increasingly slender or thin. Fundamentally, reduction of rotating mass results in reduction of the encountered stress operating at the center of rotation.

Figure 16:
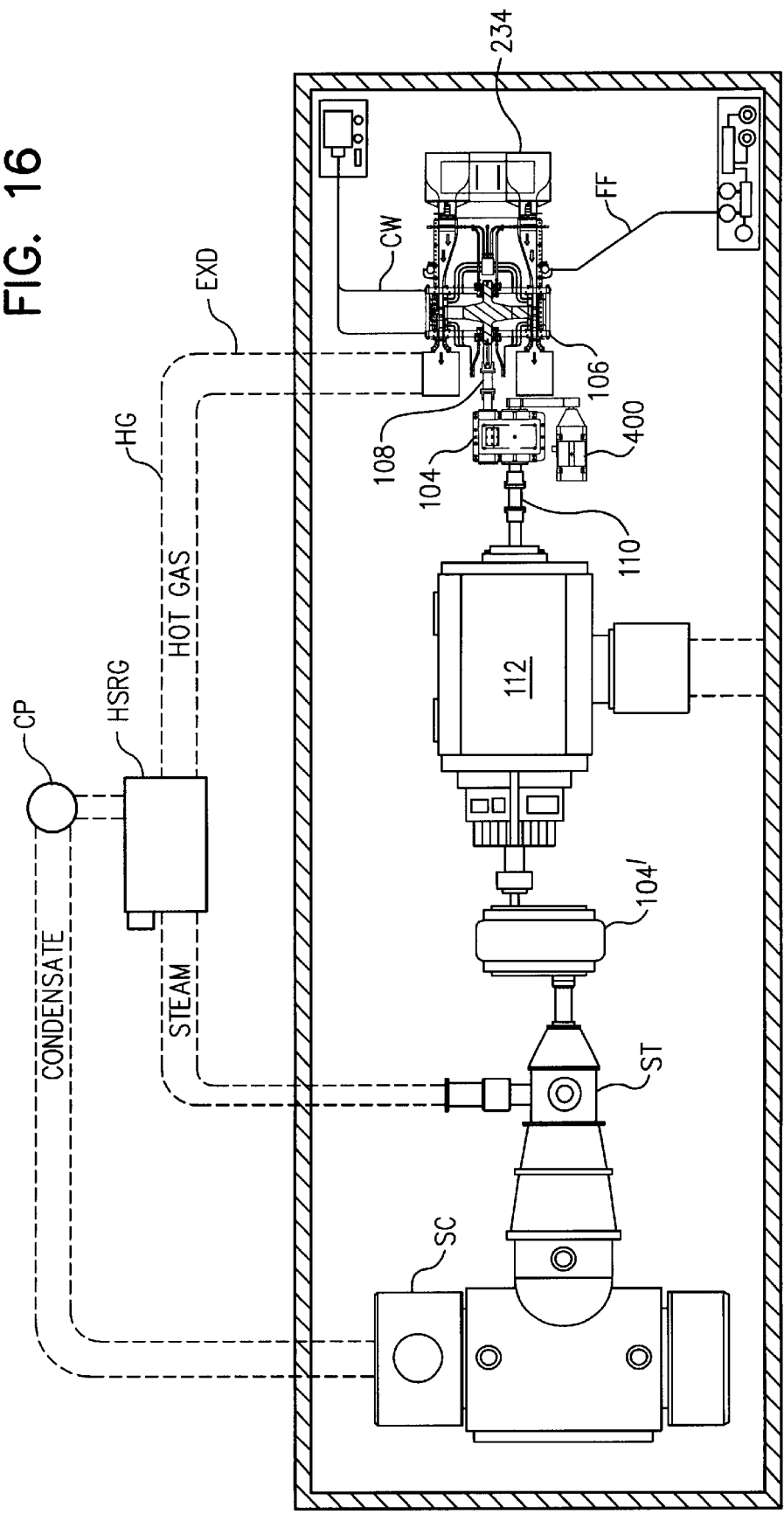
FIG. 16 is a plan view of combined cycle power plant which uses my novel supersonic ramjet thrust module driven engine as a prime mover, provided as shown using the combination of an electrical generator and a steam turbine, which as shown is also used for electrical generation.
Figure 17:
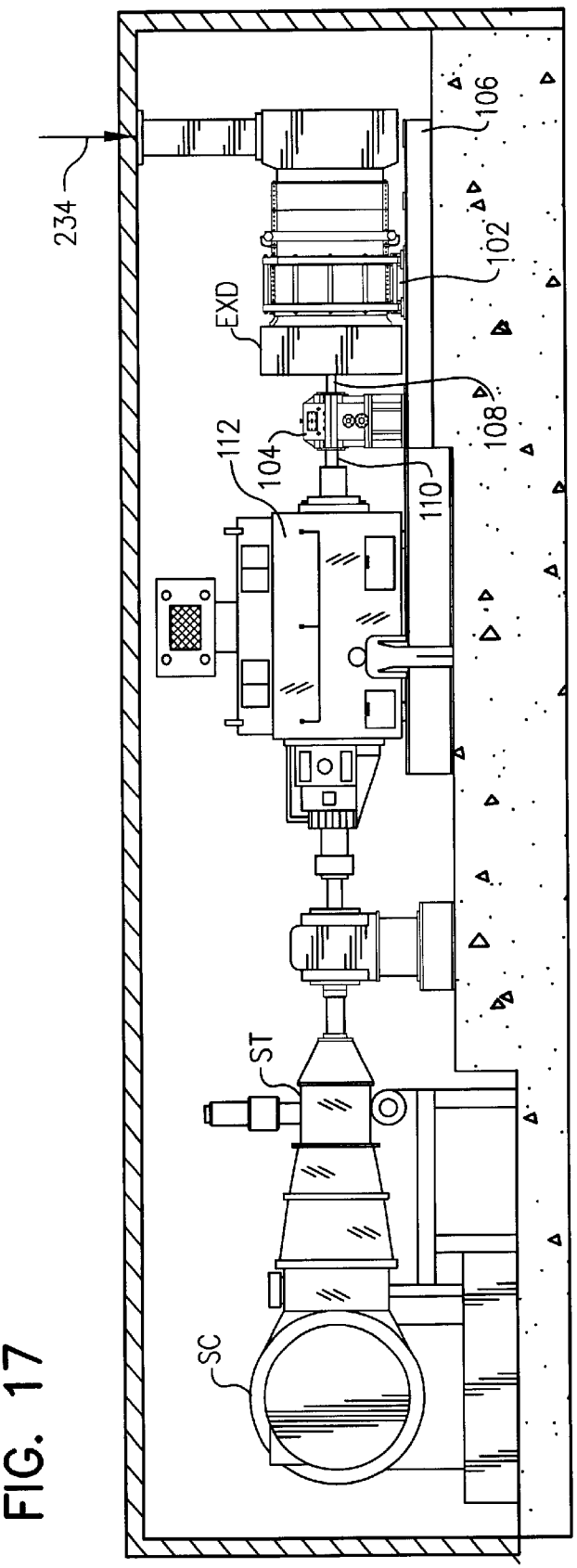
FIG. 17 is a side elevation view of a combined cycle plant which uses my novel ramjet thrust module driven engine as a prime mover, provided as shown in FIG. 16, in combination with an electrical generator and steam turbine.

Attention is now directed to FIGS. 16 and 17, where my power plant is illustrated in conjunction with electrical power generation equipment. The shaft portion 108 acts in conventional fashion to transmit mechanical power to the primary gear-box 104. The gear-box 104 reduces the speed between shaft 108 and shaft 110 to a sufficiently low level to accommodate the capabilities of the desired application. In FIGS. 1, 16, and 17, the primary gear-box 104 is connected by shaft 110 to primary electrical generator 112, suited to generate electrical power for transmission to a power grid or other electrical load. However, shaft 108 could be applied directly to do desired mechanical work.

For starting the ramjet engine, a starter motor 400 is shown connected to gear set 104. The motor 400 is configured to rotate shaft 108, and thus rotor 120, and bring the ramjet thrust modules U up to a convenient tangential velocity so as to enable the start of the ramjets U. Once ramjets U are running, the motor 400 is turned off.

Control of fuel supply is also important. Starting, as well as modulating the ramjets U can be accomplished with a secondary fuel 500 supplied via line 502 to injectors 504. This fuel is lit by a plasma torch 506 or other suitable igniter, preferably in airfoil shape in the inlet air stream, to feed into the ramjet U. Once this secondary fuel supply is started on the ramjet flame holder 214, the fuel FF is then introduced through injectors 236.

Figure 13:
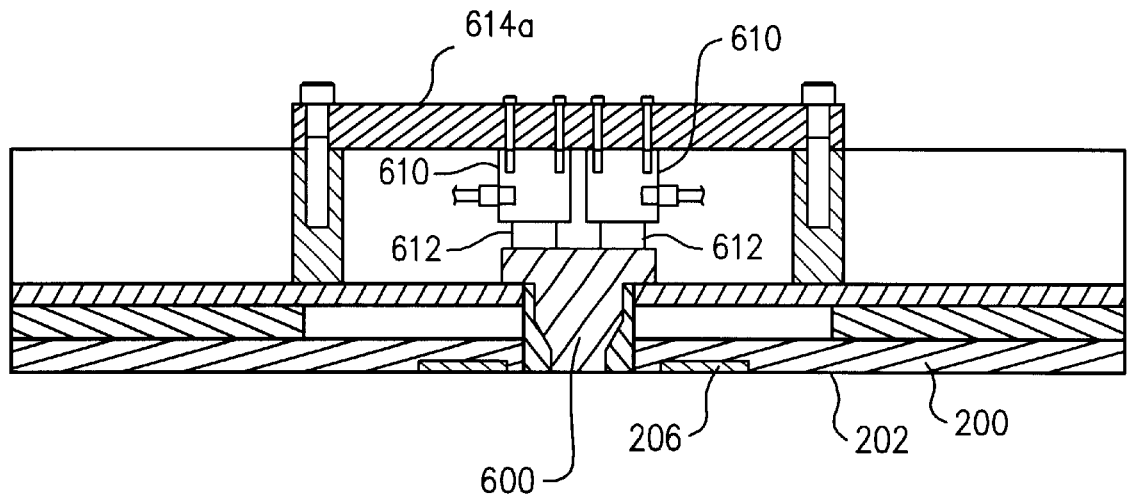
FIG. 13 shows a cross-sectional view of a section of the peripherial wall portion of the engine, taken as if along a portion of line 13—13 of FIG. 2 in the region adjacent the strake, showing a gas bypass valve in the form of an annular segment gate valve, with the valve depicted in a closed position.
Figure 14:
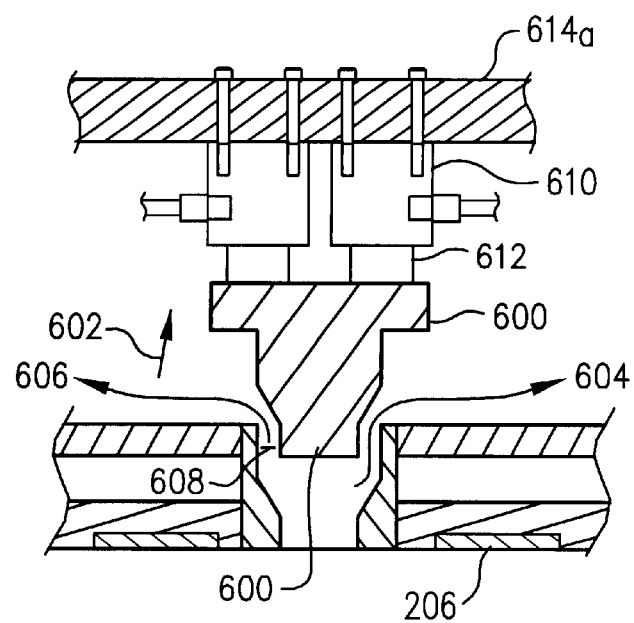
FIG. 14 shows a cross-sectional view of a section of the peripherial wall portion of the engine, similar to FIG. 13 above, but now showing the gas bypass valve in an open position, as used to spill air through the peripheral sidewall during startup of the ramjet thrust modules.
Figure 15:
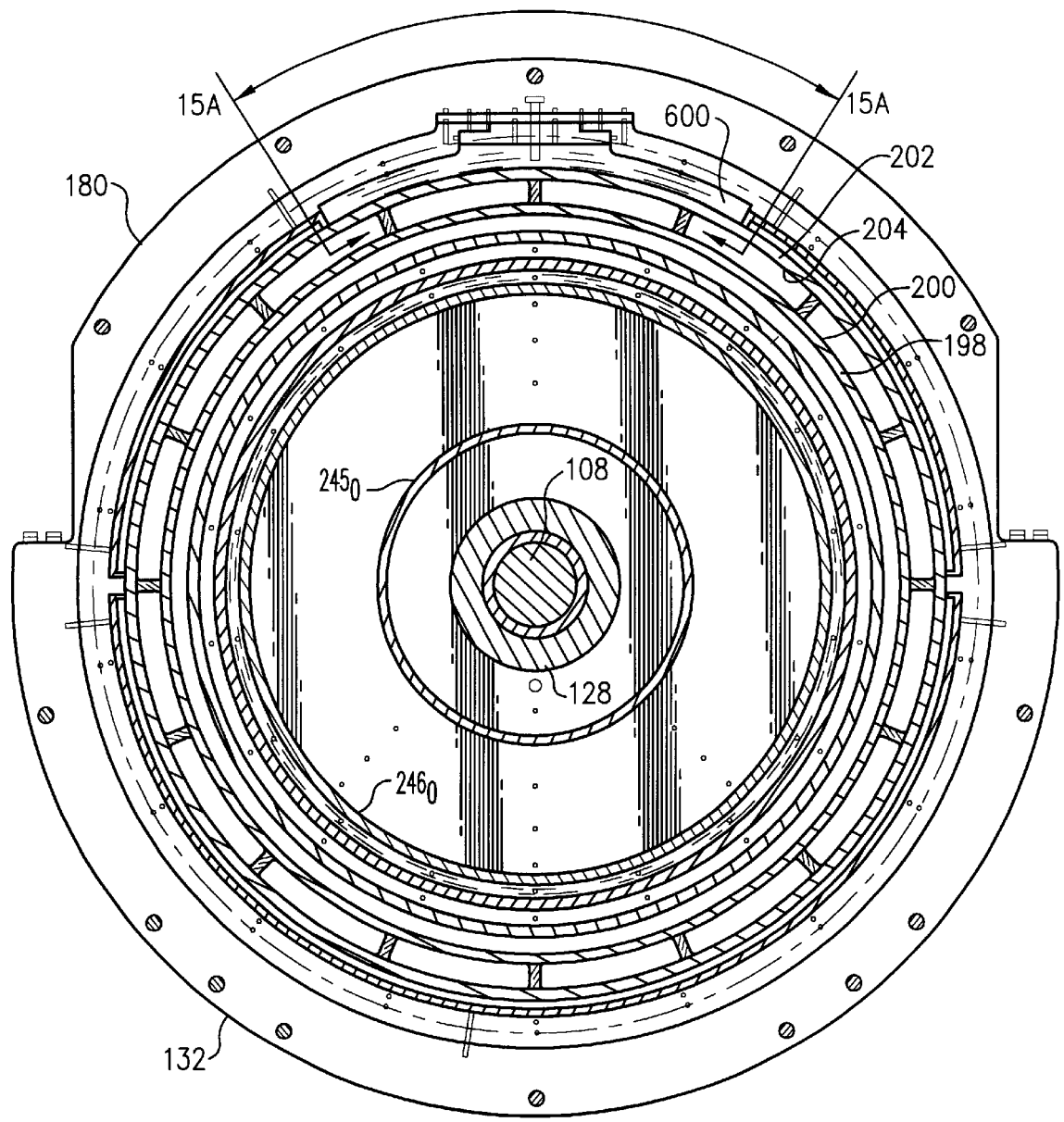
FIG. 15 shows a vertical elevation view of one embodiment of an engine bearing plate frame for my power plant, taken along line 15—15 and 15A–15-A of FIG. 1 (see also FIG. 2), showing the bearing plate frame, combustion exhaust passageways, passageways for cooling air, cooling water, and vacuum.

As seen in FIGS. 13, 14, and 18, a series of variable position dump valves 600, here shown as annular gate valves, are provided around the edge of peripheral wall 200. For starting, the annular gate valve 600 is opened in the direction of reference arrow 602 as shown in FIG. 14, forming a gap 608, so that a portion of the incoming air which is being compressed against surface 202 of the cooperating peripheral wall 200 can escape outwardly in the direction of arrows 604 and 606. The unique partially shrouded ramjet U allows the escapement of bypass air 604 and 606. Once the ramjet U has "swallowed" the shock structure, then the dump valve(s) 600 can be closed by actuator 610, as illustrated in FIG. 13. I have shown a hydraulic actuator 610 with shaft 612, mounted by bracket 614a. However, any convenient dump valve shape, using a mechanical, electrical, or hydraulic actuator, may be utilized as convenient for this purpose.

Also shown in FIGS. 16 and 17 is the use, in a combined cycle system, of hot exhaust combustion gases from ramjets U. As shown, the hot exhaust gases are conveniently collected by an exhaust gas duct EXD. The exhaust gas duct EXD is directed to a heat recovery steam generator (HSRG), where steam is produced for driving a steam turbine ST. Steam is generated in the heat recovery steam generator (HSRG) by heating condensate returned from the steam condenser SC via condensate pump CP. This is the commonly encountered design, where the working fluid is water. Although the water is most easily heated to high pressure steam and thereafter used to drive a steam turbine, it can also be used for supply of thermal energy in a co-generation application. Also, as illustrated, the steam turbine ST can be used to produce shaft work for use in electric generator 112, typically through gear box 104, or through an alternate electrical generator. Alternately, the steam turbine ST could be utilized to provide shaft work for other purposes.

Because the ramjet thrust determines the overall power plant output, the thrust from the ramjet is an important figure of merit for overall plant output levels. The ramjet thrust levels and the overall plant output levels increase in direct proportion with the mass captured and processed by the ramjet. Thus, for the same temperature and pressure conditions, doubling the inlet area and mass capture results in doubling the thrust generated, and thus results in doubling the power output of the system.

Finally, even though high combustion temperatures are experienced, my design allows extremely low nitrogen oxide output. This is because of the short residence times at the high combustion temperatures, and because the fuel is extremely well mixed. This shock-boundary layer interaction premixing technique is a unique approach for achieving a near perfectly premixed conditions and low nitrogen oxides emission. Thus, nitrogen dioxide emissions are limited by limiting the size of highly non-equilibrium free-radical zones in the combustor. NOx emissions are estimated to be less than 5 ppm, or EI is less than 0.5 grams of nitrogen dioxide per kilogram of fuel.

The method and apparatus for producing mechanical, electrical, and thermal power as described above provides a revolutionary, compact, easily constructed, cost effective power plant. The output from this power plant can be used in conjunction with existing power delivery systems, and represents a significant option for reducing air emissions by combustion of clean burning fuels. Further, given the efficiencies, dramatically less fuel will be consumed per unit of electrical, mechanical, or thermal energy generated.

It will thus be seen that the objects set forth above, including those made apparent from the proceeding description, are efficiently attained, and, since certain changes may be made in carrying out the construction of a power generation apparatus and in the execution of the method of power generation described herein, while nevertheless achieving desirable results in accord with the principles generally set forth herein, it is to be understood that the invention may be embodied in other specific forms without departing from the spirit or essential characteristics thereof. For example, while I have set forth exemplary designs for a fuel feed arrangement, many other embodiments are also feasible to attain the result of the principles of the apparatus and via use of the methods disclosed herein.

All the features disclosed in this specification, including accompanying claims, the drawing, and the abstract, and/or any steps in the method or process so disclosed, may be combined in combination, except combinations where at least some of the features and/or steps are mutually exclusive.

Each feature disclosed in this specification (including in the accompanying claims, the drawing, and the abstract), may be replaced by alternative features serving the same or similar purpose, unless expressly stated otherwise. Thus, unless expressly stated otherwise, each feature disclosed is one example only of a generic series of equivalent or similar features.

Therefore, it will be understood that the foregoing description of representative embodiments of the invention have been presented only for purposes of illustration and for providing an understanding of the invention, and it is not intended to be exhaustive or restrictive, or to limit the invention to the precise forms disclosed. On the contrary, the intention is to cover all modifications, equivalents, and alternatives falling within the spirit and scope of the invention as expressed in the appended claims. As such, the claims are intended to cover the structures and methods described therein, and not only the equivalents or structural equivalents thereof, but also equivalent structures or methods. Thus, the scope of the invention, as indicated by the appended claims, is intended to include variations from the embodiments provided which are nevertheless described by the broad meaning and range properly afforded to the language of the claims, or to the legal equivalents thereof.

What is claimed is:

1. An apparatus for generation of power, said apparatus comprising:
    (a) an air inlet for supply of combustion air;
    (b) a fuel inlet for supply of oxidizable fuel;
    (c) a rotor, said rotor having a central axis and adapted for rotary motion thereabout, said rotor constructed of materials having a specific strength commensurate with a selected rotor speed and rotor geometry, said rotor having opposing inlet side and outlet side surfaces, said rotor extending radially outward from said central axis to an outer surface portion having an outer extremity;
    (d) a first tight fitting housing adjacent at least a portion of said inlet side surface of said rotor, and a second tight fitting housing adjacent at least a portion of said outlet side surface of said rotor, said first and second housings adapted to reduce aerodynamic drag on said rotor;
    (e) a peripheral wall, said peripheral wall
        (i) positioned radially outward from
            (A) said central axis, and
            (B) said outer extremity of said rotor; and
        (ii) having an interior surface portion;
    (f) one or more ramjets, each of said one or more ramjets comprising a rotating portion located along a portion of said outer extremity of said rotor, said rotating portion cooperating with a portion of said peripheral wall to compress therebetween inlet combustion air;
    (g) one or more strakes, each of said one or more strakes provided adjacent to one of said or more ramjets, and at least a portion of each of said one or more strakes extending outward from at least a portion of said outer surface portion of said rotor to a point adjacent said interior surface portion of said peripheral wall;
    (h) whereby said one or more strakes effectively separate said compressed combustion air from exhaust gases which are produced as said one or more ramjets
        (i) compress inlet air, and
        (ii) oxidize fuel supplied thereto,
        (iii) generate exhaust gases therefrom, and
        (iv) develop thrust to effect rotary motion of said rotor about said axis of rotation.

2. The apparatus as set forth in claim 1, wherein each of said one or more strakes comprises a helical structure extending peripherally from said outer surface portion of said rotor.

3. The apparatus as set forth in claim 2, wherein the number of said one or more helical strakes is N, and the number of said one or more ramjets is X, and wherein N and X are equal.

4. The apparatus as set forth in claim 1 or claim 2, wherein each of said one or more ramjets utilize at least a portion of said inner surface portion of said peripheral wall for decompression of escaping combustion gases.

5. The apparatus as set forth in claim 1, wherein said inner surface portion of said peripheral wall further comprises a wear ring seal, said wear ring seal adapted to effectively seal the interface between each of said one or more strakes and said inner surface portion of said peripheral wall.

6. The apparatus as set forth in claim 1, wherein said outer surface portion of said rotor comprises a plurality of rim segments.

7. The apparatus as set forth in claim 6, wherein at least one of said rim segments is detachably affixed to said rotor.

8. The apparatus of claim 7, wherein said rotor further comprises a plurality of shaped attachment receiving tabs, and wherein each of said rim segments further comprises a plurality of inwardly extending Y-shaped tines, said attachment receiving tabs and said Y-shaped tines adapted for secure interlocking engagement, so as to secure said rim segments to said rotor.

9. The apparatus as set forth in claim 7, wherein said rotor further comprises a plurality of shaped attachment hinges, and wherein each of said rim segments further comprises a plurality of shaped attachment hinges complementary in size and location to said attachment hinge in said rotor, and wherein said rotor and said rim segments are joined by engaging each of their respective hinges into matching alignment, and wherein said apparatus further comprises at least one attachment pin, said attachment pin extending through at least some of said interengaging complementary attachment hinges.

10. The apparatus as set forth in claim 6, wherein each of said rim segments further comprise a cooling air receiving chamber, and wherein each of said cooling air receiving chambers effectively contains therein, for centrifugal compression and ejection therefrom, cooling air provided thereto.

11. The apparatus as set forth in claim 1, wherein said outer surface portion of said rotor further comprises at least one coolable wall, said coolable wall comprising:

(a) an interior cool wall surface, (b) an outer hot wall surface, (c) a plurality of cooling passageways having outlets at said outer hot wall surface, said cooling passageways providing a fluid conduit between said cool wall surface and said hot wall surface and adapted to pass therethrough cooling air supplied at said interior cool wall surface, so that said cooling air exits said outlets to provide a thin film of cooling air on said outer surface portion of said rotor.

12. The apparatus as set forth in claim 1, further comprising an air dump passageway for starting each of said one or more ramjets, said apparatus comprising:

(a) an air dump passageway, said air dump passageway communicating with said air inlet and with an outlet dump air location, said air dump passageway defined by a through wall portion in said peripheral wall, and (b) one or more displaceable valves, each of said one ore more displaceable valves configurable between (i) a closed position, wherein said one or more displaceable valves forms a seal in said through wall portion of said peripheral wall, and as a result substantially no inlet air escapes to said outlet dump air location, and (ii) an open position, wherein said valve allows fluid communication between said air inlet and said air dump location via said through wall portion of said peripheral wall, allowing at least a portion of said inlet air to escape through said air dump passageway;

(c) whereby each of said one or more ramjets is able to dump a portion of compressed inlet air through said air dump passageway, to thereby swallow an inlet shock and thereafter effect combustion start.

13. The apparatus as set forth in claim 12, wherein said displaceable valve comprises an annular gate valve, said annular gate valve being operatively located circumferentially along at least a portion of said peripheral wall, and wherein said annular gate valve is positioned radially outward from, and closely adjacent to, said one or more ramjets as each of said one or more ramjets rotates thereby.

14. An apparatus for generating power, comprising:

(a) a support structure, said support structure comprising (i) a circumferential housing with an inner side surface, and (i) an oxidant supply conduit, said circumferential housing comprising at least one wall of said oxidant supply conduit;

(iii) fuel supply passageways, said fuel supply passageways adapted to inject an oxidizable fuel into an oxidant contained within said oxidant supply conduit;

(b) a first output shaft, said first output shaft rotatably secured along an axis of rotation with respect to said support structure;

(c) a rotor, said rotor having a central axis and rotatably affixed with said first output shaft for rotation with respect to said support structure, said rotor further comprising a circumferential portion having a plurality of individual rim segments, said rim segments having an outer surface portion, said rotor constructed of materials having a specific strength commensurate with a selected rotor speed and rotor geometry, said rotor further comprising opposing inlet side and outlet side surfaces;

(e) a first tight fitting housing adjacent at least a portion of said inlet side surface of said rotor, and a second tight fitting housing adjacent at least a portion of said outlet side surface of said rotor, said first and second housings adapted to reduce aerodynamic drag on said rotor;

(f) one or more ramjets, said one or more ramjets each (i) comprising a rotating portion integrally provided as part of said circumferential portion of said rotor, and (ii) adapted to cooperate with and utilize at least a portion of said inner side surface of said circumferential housing to compress said supplied oxidant and said oxidizable fuel between said rotating portions and said circumferential housing housing; and (iii) wherein said rotating portion further comprises an outlet nozzle that allows combustion gases formed by oxidation of said fuel to escape, thrusting each of said one or more ramjets tangentially about said axis of rotation of said output shaft;

(e) one or more strakes, wherein one of said one or more strakes is provided for each of said one or more ramjets, and wherein each of said one or more strakes extends outward from at least a portion of said circumferential portion of said rotor to a point adjacent to said inner side surface of said circumferential housing, said strakes effectively separating said incoming inlet air from said escaping combustion gases.

15. The apparatus for generating power as recited in claim 1 or claim 14, wherein said apparatus further comprises a heat recovery section, said heat recovery section comprising a combustion gas inlet, and a combustion gas outlet, and a heat exchange section for containing therein a secondary working fluid, said secondary working fluid adapted for circulation to and from said heat recovery section, whereby said hot combustion gas is cooled by recovery of thermal energy in said secondary working fluid.

16. The apparatus as recited in claim 15, wherein said secondary working fluid comprises water, and wherein upon heating of said secondary working fluid, steam is produced.

17. The apparatus as recited in claim 16, further comprising a steam turbine, and wherein said steam is fed to said steam turbine to produce useful work on a steam turbine output shaft.

18. The apparatus as set forth in claim 17, wherein said steam turbine output shaft is operatively connected to a first electrical generator, and wherein said useful work on said steam turbine output shaft turns said first electrical generator to produce electricity.

19. The apparatus as set forth in claim 17, further comprising a second electrical generator, and wherein said shaft work produced by said steam turbine output shaft turns said second electrical generator to produce electric power.

20. The apparatus as set forth in claim 14, wherein each of said one or more ramjets operates at an inlet velocity of at least Mach 3.5.

21. The apparatus as set forth in claim 14, wherein each of said one or more ramjets operates at at least Mach 4.

22. The apparatus as set forth in claim 1 or claim 14, wherein at least one material comprising said rotor has a specific strength in excess of 683,220 inches.

23. The apparatus as set forth in claim 1 or in claim 14, wherein at least one material comprising said rotor has a specific strength between 683,220 inches and 1,300,250 inches.

24. The apparatus as set forth in claim 1, or in claim 14, wherein at least a portion of material comprising said rotor has a specific strength of approximately 1,300,250 inches.

25. The apparatus as set forth in claim 1, or claim 14, wherein at least a portion of material comprising said rotor has a specific strength in excess of 1,300,250 inches.

26. The apparatus as set forth in claim 1, or claim 14, wherein at least a portion of material comprising said rotor has a specific strength in the range from about 1,300,250 inches to about 3,752,600 inches.

27. The apparatus as set forth in claim 1, or claim 14, wherein at least a portion of material comprising said rotor has a specific strength of about 3,752,600 inches.

28. The apparatus as set forth in claim 1, or claim 14, wherein at least a portion of material comprising said rotor has a specific strength in excess of 3,752,600 inches.

29. The apparatus as set forth in claim 1, or claim 14, wherein at least a portion of material comprising said rotor has a specific strength between 3,752,600 inches and 15,000,000 inches.

30. The apparatus as set forth in claim 1, or claim 14, wherein at least a portion of material comprising said rotor has a specific strength of about 15,000,000 inches.

31. An apparatus for generating power as set forth in claim 1, or claim 14, wherein said at least one ramjet operates at an inlet velocity $M_o$ of between about Mach 1.5 and Mach 2.0.

32. An apparatus for generating power as set forth in claim 1, or claim 14, wherein said at least one ramjet operates at an inlet velocity $M_o$ of at least Mach 2.0.

33. An apparatus for generating power as set forth in claim 1, or claim 14, wherein said at least one ramjet operates at an inlet velocity $M_o$ of at least Mach 2.5.

34. An apparatus for generating power as set forth in claim 1, or claim 14, wherein said at least one ramjet operates at an inlet velocity $M_o$ of at least Mach 3.0.

35. An apparatus for generating power as set forth in claim 1, or claim 14, wherein said at least one ramjet operates at an inlet velocity $M_o$ between Mach 3.0 and Mach 4.5.

36. An apparatus for generating power as set forth in claim 1, or claim 14, wherein said at least one ramjet operates at an inlet velocity $M_o$ of approximately Mach 3.5.

37. The apparatus of claim 1, or claim 14, wherein said rotor comprises a central disc.

38. The apparatus of claim 37, wherein said central disc is tapered.

39. The apparatus of claim 1, or of claim 14, wherein said rotor comprises a metal matrix composite.

40. The apparatus of claim 39, wherein said metal matrix composite comprises titanium.

41. The apparatus of claim 39, wherein said metal matrix composite comprises silicon carbide.

42. The apparatus of claim 39, wherein said metal matrix composite further comprises silicon carbide filaments.

43. The apparatus of claim 1, or claim 14, wherein said rotor comprises silicon carbide coated carbon fibers embedded in a titanium metal substrate.

44. The apparatus of claim 1, or claim 14, wherein said rotor comprises a carbon fiber epoxy composite.

45. The apparatus of claim 44, wherein said rotor further comprises high strength fiber windings.

46. The apparatus of claim 45, wherein said high strength fiber windings comprise monofilament carbon fibers.

47. The apparatus of claim 14, wherein said high strength fiber windings comprise kevlar fibers.

48. The apparatus as set forth in claim 1, or in claim 14, wherein one or more of said strakes further comprises a plurality of cooling gas orifices, said cooling gas orifices adapted to allow cooling gas to pass through said strakes.

49. The apparatus as set forth in claim 14, further comprising a first electrical generator, and wherein wherein said first output shaft is operatively connected to said first electrical generator, and wherein said mechanical work provided at said first output shaft turns said first electrical generator to produce electricity.

50. The apparatus as set forth in claim 14, wherein each of said one or more ramjets operates at an inlet velocity of at least Mach 3.

51. A method of generating power, comprising:
(a) providing one or more ramjet thrust modules peripherally on a rotor which is rotatably secured with respect to an outboard housing having an inner surface, said rotor constructed of materials having a specific strength commensurate with a selected rotor speed and rotor geometry, said rotor having opposing inlet side and outlet side surfaces, said rotor extending radially outward from said central axis to an outer surface portion having an outer extremity;
(b) providing a first tight fitting housing adjacent at least a portion of said inlet side surface of said rotor, and providing a second tight fitting housing adjacent at least a portion of said outlet side surface of said rotor, said first and second housings adapted to reduce aerodynamic drag on said rotor;
(c) supplying to said one or more ramjet thrust modules an airstream containing an oxidant and an oxidizable fuel;
(d) oxidizing said fuel between said one or more ramjet thrust modules and said outboard housing, to
(i) generate combustion gases which escape therefrom, to
(ii) generate a motive force by thrust reaction of said combustion gases escaping from between
(A) each of said one or more ramjet thrust modules, and
(B) at least a portion of said outboard housing;
(e) propelling said one or more ramjet thrust modules at an inlet velocity in excess of Mach 1.0 through said supplied airstream by way of said motive force, said one or more ramjet thrust modules relying on at least a portion of said inner surface of said outboard housing to assist in compression of a portion of said supplied airstream as each of said one or more ramjet thrust modules passes adjacent thereto;
(f) effectively separating inlet air from combustion gases by using one or more strakes along the periphery of said rotor, each of said one or more strakes provided adjacent to one of said or more ramjets, and at least a portion of each of said one or more strakes extending outward from at least a portion of an outer surface portion of said rotor to a point adjacent said inner surface of said outboard housing;
(g) turning an output shaft operatively connected to said one or more ramjet thrust modules;
(h) whereby power is provided at said output shaft.

52. The method as recited in claim 51, wherein the inlet velocity of each of said one-or more ramjet thrust modules is at least Mach 2.5.

53. The method as recited in claim 51, wherein the inlet velocity of each of said one or more ramjet thrust modules is between Mach 2.5 and Mach 4.

54. The method as recited in claim 51, wherein the inlet velocity of said one or more ramjet thrust modules is approximately Mach 3.5.

55. The method as recited in claim 51, wherein said fuel is a selected from the group comprising gaseous hydrocarbon fuels and hydrogen.

56. The method as recited in claim 51, wherein said fuel is essentially natural gas.

57. The method as recited in claim 51, wherein the step of supplying fuel comprises injecting said fuel into a portion of said supplied airstream radially inward of said outboard housing at a point prior to compression of said portion of said supplied airstream between said outboard housing and any one of said one or more ramjet thrust modules.

58. The method as recited in claim 51, wherein said method further comprises the step of generating electricity.

59. The method of generating power as recited in claim 51, wherein said method further includes the step of recovering thermal energy from said combustion gases.

60. The method as recited in claim 59, wherein said thermal energy recovery step comprises transfer of said thermal energy from said combustion gases to a secondary working fluid.

61. The method as recited in claim 60, wherein said secondary working fluid is water, and wherein steam is produced by heating said water.

62. The method as recited in claim 60, wherein said thermal energy recovery step comprises indirect heating of said secondary working fluid by said combustion gases.

63. The method as recited claim 61, further comprising the step of directing said secondary working fluid to a turbine having a working shaft, and generating power by rotation of said turbine by said secondary working fluid, to produce shaft work from said turbine.

64. The method as recited in claim 63, further comprising the step of generating electricity from said shaft work of said turbine.

65. The method as recited in claim 51, further comprising the step of minimizing aerodynamic drag as said one or more thrust modules rotates at supersonic speed.

66. The method as set forth in claim 65, wherein at least a portion of said rotor is confined within a substantially gas tight housing, and wherein said housing is maintained under vacuum to reduce aerodynamic drag on said rotor.

67. The method as recited in claim 65, wherein said step of minimizing aerodynamic drag further comprises the step of maintaining a partial vacuum along a substantial radial portion of said rotor, said substantial radial portion located at said first and said second tight fitting housings.

68. The method as recited in claim 51, wherein said rotor further comprises a plurality of detachable rim segments, said rim segments further comprising ventilatable cooling chambers, and wherein said method further comprises the step of providing cooling air flow to and through said ventilatable cooling chambers.

69. The method as recited in claim 51, wherein each of said one or more ramjet thrust modules are circumferentially spaced apart so as to engage said supplied airstream substantially free of turbulence from the previous passage through a given circumferential location of any one of said one or more ramjet thrust modules.

70. The method as recited in claim 51, wherein the step of supplying fuel comprises injecting said fuel into a portion of said supplied inlet airstream at a point prior to compression of said portion of said supplied airstream between said circumferential wall and any one of said one or more thrust modules.

71. The method as set forth in claim 51, wherein said rotor further comprises a plurality of outer rim segments, at least some of which have at least one coolable wall, said at least one coolable wall comprising:

(a) an interior cool wall surface, (b) an outer hot wall surface, (c) a plurality of cooling passageways having outlets at said outer hot wall surface, (d) said method further comprising the step of supplying a cooling fluid behind said interior cool wall surface, and passing an amount of said cooling fluid outward through said cooling passageways to said outlets, in an amount sufficient to effect film cooling of said outer hot wall surface of said outer rim segments.

72. The method as set forth in claim 51, wherein said one or more stakes further comprises a plurality of through passageways, and wherein the step of supplying cooling fluid further comprises supplying an amount of cooling fluid sufficient to effect film cooling of said one or more strakes via passage of said cooling fluid through said plurality of through passageways.

73. The method as set forth in claim 51, or in claim 72, wherein said one or more stakes further comprises a plurality of orifices, and wherein said method further comprises the step of passing cooling gas through said orifices in an amount sufficient to minimize aerodynamic drag on said one or more stakes.

\* \* \* \* \*

UNITED STATES PATENT AND TRADEMARK OFFICE
CERTIFICATE OF CORRECTION

PATENT NO. : 6,446,425 B1
DATED : September 10, 2002
INVENTOR(S) : Shawn P. Lawlor et al.

It is certified that error appears in the above-identified patent and that said Letters Patent is hereby corrected as shown below:

Title page,
Item [54], References Cited, U.S. PATENT DOCUMENTS, delete "3,557,511" and substitute therefore -- 3,557,551 --; after "5,372,005 A 12/1994", delete "Lawler" and substitute therefore -- Lawlor --; add reference -- 3,971,209 7/1976 de Chair --

FOREIGN PATENT DOCUMENTS, add the following references:
-- AU    164,359     3/1956
   UK    1041444     9/1966
   WO    WO98/16722     4/1988 --

Column 1,
Line 15, after the word "fundamentals" insert -- of --.

Column 3,
Line 21, after the word "generation", delete "equipment of" and substitute therefore -- equipment. Of --.
Line 52, after the word "In" delete "another ," and substitute therefore -- another, --.

Column 6,
Line 21, after the word "particular", insert -- , --.

Column 8,
Line 54, delete "prevent" and substitute therefore -- preventing --.
Line 55, after the word "side", delete "SEX" and substitute therefore -- $S_{EX}$ --.

Column 13,
Line 29, after the words "materials can be increased by", delete "increased by".

Column 16,
Line 46, delete the word "secure" and substitute therefore -- securing --.

Column 18,
Line 12, after the words "circumferential housing", delete "housing".

Column 19,
Line 59, after the word "claim" delete "14" and substitute therefore -- 45 --.
Line 66, after the words "and wherein" delete second reference of the word "wherein".

UNITED STATES PATENT AND TRADEMARK OFFICE
CERTIFICATE OF CORRECTION

PATENT NO.    : 6,446,425 B1
DATED         : September 10, 2002
INVENTOR(S)   : Shawn P. Lawlor et al.

It is certified that error appears in the above-identified patent and that said Letters Patent is hereby corrected as shown below:

<u>Column 22,</u>
Line 42, delete "stakes" and substitute therefore -- strakes --.

Signed and Sealed this

Twenty-seventh Day of April, 2004

JON W. DUDAS
*Acting Director of the United States Patent and Trademark Office*